(12) United States Patent
Ryu et al.

(10) Patent No.: US 12,306,379 B2
(45) Date of Patent: May 20, 2025

(54) DISPLAY PROTECTOR

(71) Applicant: WHITESTONE CO.,LTD., Chungcheongnam-do (KR)

(72) Inventors: Jong Yun Ryu, Gyeonggi-do (KR); Chan Hyun Park, Gyeonggi-do (KR); Jae Yong Jeong, Chungcheongnam-do (KR); Myoung Jin Cha, Gyeonggi-do (KR); Bin Hee Kwon, Chungcheongnam-do (KR)

(73) Assignee: WHITESTONE CO., LTD., Chungcheongnam-do (KR)

( * ) Notice: Subject to any disclaimer, the term of this patent is extended or adjusted under 35 U.S.C. 154(b) by 237 days.

(21) Appl. No.: 17/838,271

(22) Filed: Jun. 13, 2022

(65) Prior Publication Data
US 2022/0413187 A1    Dec. 29, 2022

(30) Foreign Application Priority Data

Jun. 11, 2021 (KR) .................. 10-2021-0076238
Sep. 15, 2021 (KR) .................. 10-2021-0123111

(51) Int. Cl.
| | |
|---|---|
| *B32B 15/04* | (2006.01) |
| *B32B 3/02* | (2006.01) |
| *B32B 7/12* | (2006.01) |
| *B32B 17/06* | (2006.01) |
| *B32B 17/10* | (2006.01) |
| *B32B 27/36* | (2006.01) |
| *B32B 27/40* | (2006.01) |

(Continued)

(52) U.S. Cl.
CPC ............ *G02B 1/14* (2015.01); *B32B 3/02* (2013.01); *B32B 7/12* (2013.01); *B32B 17/10* (2013.01); *B32B 27/36* (2013.01); *B32B 27/40* (2013.01); *C03C 4/00* (2013.01); *G06F 1/1652* (2013.01); *B32B 2307/412* (2013.01)

(58) Field of Classification Search
CPC ....................................................... B32B 17/10
USPC ............................................................ 428/426
See application file for complete search history.

(56) References Cited

U.S. PATENT DOCUMENTS

| | | |
|---|---|---|
| 9,603,271 B2 | 3/2017 | Lee et al. |
| 9,661,719 B2 | 5/2017 | Jang et al. |

(Continued)

FOREIGN PATENT DOCUMENTS

| | | |
|---|---|---|
| CN | 111621245 | 9/2020 |
| CN | 112735278 | 4/2021 |

(Continued)

OTHER PUBLICATIONS

"Office Action of Korea Counterpart Application", issued on Aug. 14, 2023, with English translation thereof, p. 1-p. 27.

(Continued)

*Primary Examiner* — Lauren R Colgan
(74) *Attorney, Agent, or Firm* — JCIPRNET

(57) ABSTRACT

A display protector includes a transparent base layer having a first surface and a second surface opposite to the first surface; a first stress relief adhesive layer on the first surface of the transparent base layer; a second stress relief adhesive layer on the second surface of the transparent base layer; and an ultra-thin glass (UTG) layer on the first stress relief adhesive layer, wherein a storage modulus of the first stress relief adhesive layer is about 0.03 MPa to about 0.2 MPa at −10° C.

20 Claims, 11 Drawing Sheets

(51) Int. Cl.
*C03C 4/00* (2006.01)
*G02B 1/14* (2015.01)
*G06F 1/16* (2006.01)

(56) References Cited

U.S. PATENT DOCUMENTS

| | | | |
|---|---|---|---|
| 10,248,165 B2 | 4/2019 | Myung et al. | |
| 10,259,978 B2 | 4/2019 | Kim et al. | |
| 10,303,217 B2* | 5/2019 | Seo | H05K 5/0217 |
| 10,465,098 B2 | 11/2019 | Lee et al. | |
| 10,586,941 B2* | 3/2020 | Lee | H10K 77/111 |
| 10,620,465 B2* | 4/2020 | Lee | G02F 1/133528 |
| 10,920,113 B2 | 2/2021 | Park et al. | |
| 10,947,420 B2* | 3/2021 | Park | C09J 183/04 |
| 11,329,250 B2* | 5/2022 | Song | G09F 9/301 |
| 11,348,487 B2* | 5/2022 | Lee | G09F 9/301 |
| 2016/0002103 A1* | 1/2016 | Wang | C03B 33/091 |
| | | | 428/141 |
| 2017/0200915 A1* | 7/2017 | Lee | B32B 7/12 |
| 2018/0101253 A1* | 4/2018 | He | C03C 27/10 |
| 2018/0129317 A1* | 5/2018 | Ryu | B32B 17/10 |
| 2019/0086709 A1* | 3/2019 | Lee | G02F 1/133308 |
| 2019/0115547 A1* | 4/2019 | Lee | B32B 27/365 |
| 2019/0258296 A1* | 8/2019 | Seo | G06F 1/1652 |
| 2020/0058899 A1* | 2/2020 | Bu | G02F 1/1339 |
| 2020/0291276 A1 | 9/2020 | Song et al. | |
| 2020/0292731 A1 | 9/2020 | Park et al. | |
| 2020/0377768 A1* | 12/2020 | Song | C09J 11/06 |
| 2021/0036259 A1* | 2/2021 | Song | H10K 59/8791 |
| 2021/0260852 A1* | 8/2021 | Cho | B32B 17/10 |
| 2021/0332273 A1* | 10/2021 | Mun | C09J 7/10 |
| 2022/0216448 A1* | 7/2022 | Wang | H10K 50/865 |
| 2022/0251425 A1 | 8/2022 | Yoo et al. | |

FOREIGN PATENT DOCUMENTS

| | | |
|---|---|---|
| CN | 213184292 | 5/2021 |
| CN | 112996661 | 6/2021 |
| KR | 1020150105138 | 9/2015 |
| KR | 1020160069560 | 6/2016 |
| KR | 1020160083789 | 7/2016 |
| KR | 1020160096402 | 8/2016 |
| KR | 1020170084402 | 7/2017 |
| KR | 101814249 | 1/2018 |
| KR | 1020180005787 X | 1/2018 |
| KR | 1020180028958 | 3/2018 |
| KR | 101923941 | 2/2019 |
| KR | 1020190018114 | 2/2019 |
| KR | 1020190032686 | 3/2019 |
| KR | 1020190094119 | 8/2019 |
| KR | 1020190098435 | 8/2019 |
| KR | 102024252 | 9/2019 |
| KR | 102068685 | 1/2020 |
| KR | 102176858 | 11/2020 |
| KR | 1020210059629 | 5/2021 |

OTHER PUBLICATIONS

"Office Action of Taiwan Counterpart Application", issued on Feb. 7, 2023, with English translation thereof, pp. 1-22.
Office Action of China Counterpart Application, with English translation thereof, issued on Sep. 14, 2023, pp. 1-16.
Office Action of Japan Counterpart Application, with English translation thereof, issued on Jun. 27, 2023, pp. 1-6.
"Search Report of Europe Counterpart Application", issued on May 10, 2022, p. 1-p. 7.

* cited by examiner

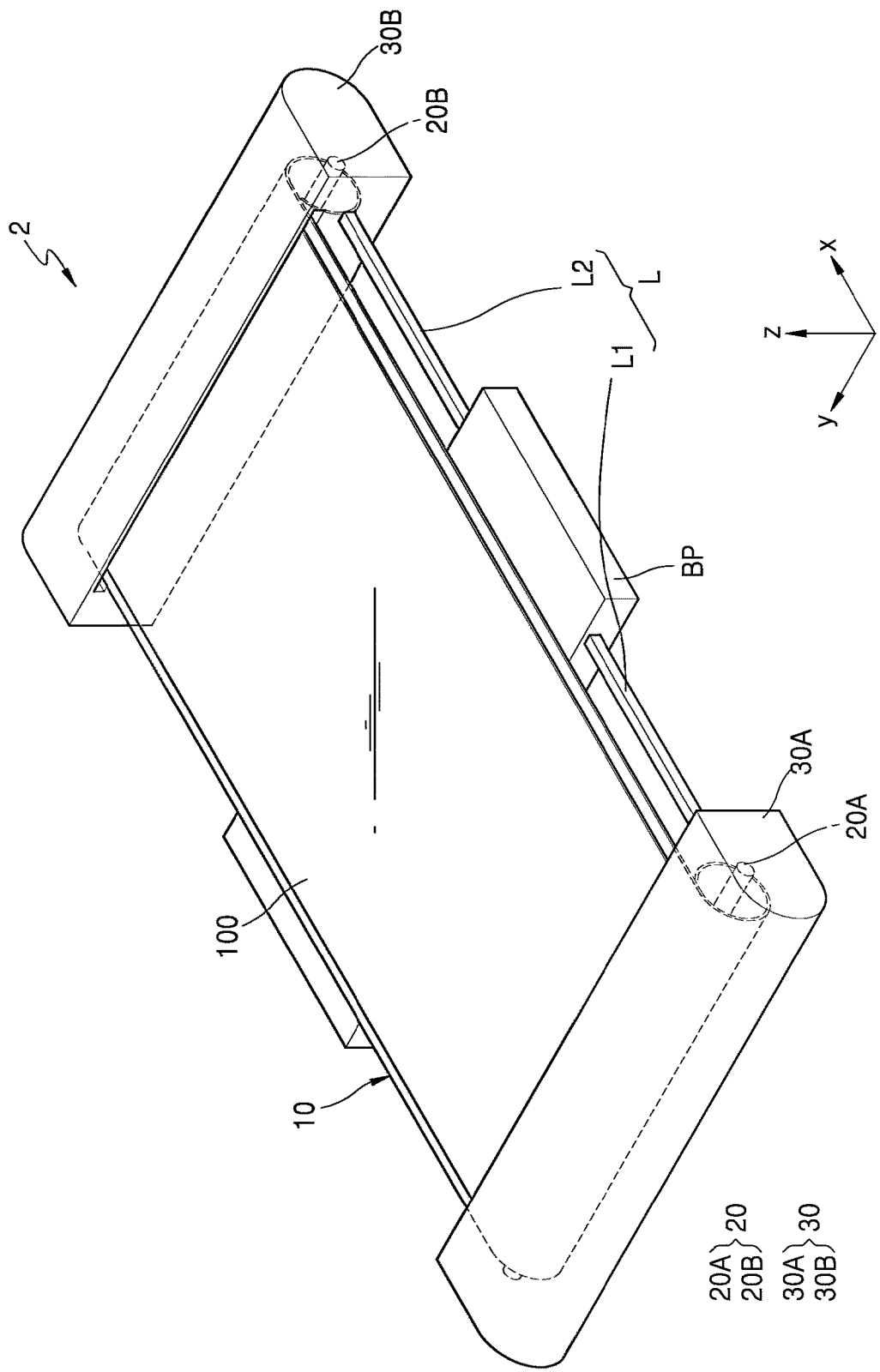

DISPLAY PROTECTOR

CROSS-REFERENCE TO RELATED APPLICATIONS

This application is based on and claims priority under 35 U.S.C. § 119 to Korean Patent Application Nos. 10-2021-0076238, filed on Jun. 11, 2021, and 10-2021-0123111, filed on Sep. 15, 2021, in the Korean Intellectual Property Office, the disclosures of which are incorporated by reference herein in their entirety.

BACKGROUND

1. Field

One or more embodiments relate to a display protector, and more particularly, to a display protector that is not only compatible with a foldable device or a rollable device, but also has excellent folding reliability so as not to peel off even when used for a long time on the foldable device or the rollable device and is relatively easily detachable when desired.

2. Description of the Related Art

As foldable devices and rollable devices are gradually put into practical use, the demand for display protectors capable of protecting display areas of the foldable devices and rollable devices is also increasing. In particular, display protectors employed on foldable devices and rollable devices must withstand folding and rolling numerous times over a long period of time. Accordingly, a display protector having high reliability against folding and rolling is requested.

SUMMARY

One or more embodiments include a display protector that is not only compatible with a foldable device or a rollable device, but also has excellent folding reliability so as not to peel off even when used for a long time on the foldable device or the rollable device and is relatively easily detachable when desired.

One or more embodiments include a display protector attachment kit that may be used to easily attach a display protector which has excellent folding reliability so as not to peel off even when used for a long time, on a foldable device or a rollable device and is relatively easily detachable when desired.

Additional aspects will be set forth in part in the description which follows and, in part, will be apparent from the description, or may be learned by practice of the presented embodiments of the disclosure.

According to one or more embodiments, a display protector includes a transparent base layer having a first surface and a second surface opposite to the first surface; a first stress relief adhesive layer on the first surface of the transparent base layer; a second stress relief adhesive layer on the second surface of the transparent base layer; and an ultra-thin glass (UTG) layer on the first stress relief adhesive layer, wherein a storage modulus of the first stress relief adhesive layer is about 0.1 MPa to about 0.5 MPa at $-20°$ C.

In some embodiments, each of the first stress relief adhesive layer and the second stress relief adhesive layer may have an adhesive strength of about 600 $g_f$/in to about 1,500 $g_f$/in. In some embodiments, the storage modulus of the first stress relief adhesive layer may be about 0.02 MPa to about 0.2 MPa at $+40°$ C. In some embodiments, a storage modulus of the second stress relief adhesive layer may be about 0.03 MPa to about 0.2 MPa at $-10°$ C. In some embodiments, a storage modulus of the second stress relief adhesive layer may be about 0.02 MPa to about 0.2 MPa at $+40°$ C.

In some embodiments, the display protector may further include a scattering prevention coating layer on the UTG layer.

In some embodiments, the UTG layer may have a thickness of about 30 micrometers ($\mu$m) to about 70 $\mu$m, and may have been tempered not to be damaged when folded at a radius of curvature of 1.0 mm. In some embodiments, the storage modulus of the first stress relief adhesive layer may be less than or substantially equal to a storage modulus of the second stress relief adhesive layer.

According to one or more embodiments, a display protector includes a transparent base layer having a first surface and a second surface opposite to the first surface; a first stress relief adhesive layer on the first surface of the transparent base layer; a second stress relief adhesive layer on the second surface of the transparent base layer; and an ultra-thin glass (UTG) layer on the first stress relief adhesive layer, wherein each of the first stress relief adhesive layer and the second stress relief adhesive layer has an adhesive strength of about 600 $g_f$/in to about 1,500 $g_f$/in with respect to the transparent base layer and foldable and rollable displays.

In some embodiments, a storage modulus of each of the first stress relief adhesive layer and the second stress relief adhesive layer may be about 0.03 MPa to about 0.18 MPa at $-10°$ C. In some embodiments, the storage modulus of each of the first stress relief adhesive layer and the second stress relief adhesive layer may be about 0.06 MPa to about 0.14 MPa at $-10°$ C. In some embodiments, a storage modulus of each of the first stress relief adhesive layer and the second stress relief adhesive layer may be about 0.02 MPa to about 0.18 MPa at $+40°$ C. In some embodiments, the storage modulus of each of the first stress relief adhesive layer and the second stress relief adhesive layer may be about 0.04 MPa to about 0.14 MPa at $+40°$ C.

In some embodiments, a corner of the UTG layer may include a curved line having a radius of curvature of about 0.5 mm to about 3 mm. In some embodiments, a thickness of the UTG layer may be about 30 $\mu$m to about 70 $\mu$m.

According to one or more embodiments, a display protector includes a transparent base layer having a first surface and a second surface opposite to the first surface; a first stress relief adhesive layer on the first surface of the transparent base layer; a second stress relief adhesive layer on the second surface of the transparent base layer; and an ultra-thin glass (UTG) layer on the first stress relief adhesive layer. Here, the UTG layer includes a first glass edge and a second glass edge each extending in a first direction and positioned opposite to each other; and a third glass edge and a fourth glass edge each extending in a second direction perpendicular to the first direction and positioned opposite to each other. In addition, the transparent base layer, the first stress relief adhesive layer, and the second stress relief adhesive layer include a common outer edge, wherein the common outer edge includes a first film edge and a second film edge respectively extending parallel to the first glass edge and the second glass edge; and a third film edge and a fourth film edge respectively corresponding to the third glass edge and the fourth glass edge. Also, the first film edge and the second film edge are respectively offset inwardly from the first glass edge and the second glass edge.

In some embodiments, the display protector may be configured to be foldable with respect to a folding axis parallel to the first glass edge and the second glass edge. The third film edge may be at least partially offset outwardly from the third glass edge, the fourth film edge may be at least partially offset outwardly from the fourth glass edge, or the third film edge and the fourth film edge may be at least partially offset outwardly from the third glass edge and the fourth glass edge, respectively.

In some embodiments, the third film edge may include a first film sub-edge portion intersecting the folding axis and offset outwardly from the third glass edge; a first corner edge portion forming an end portion of the third film edge and meeting the first film edge; and a second film sub-edge portion connecting the first film sub-edge portion to the first corner edge portion. At this time, the first corner edge portion may be offset inwardly from a corresponding corner edge of the UTG layer. In addition, the second film sub-edge portion may include a portion offset outwardly from the third glass edge, and a dimension by which the second film sub-edge portion is offset outwardly may gradually decrease as a distance from the first corner edge portion decrease.

In some embodiments, the first film sub-edge portion may be offset by at least 20 micrometers (μm) outwardly from the third glass edge, and the second film sub-edge portion may be offset inwardly from a corresponding portion than the third glass edge with respect to 80% or more or a length of the second film sub-edge portion.

In some embodiments, a dimension by which the first film sub-edge portion may be offset outwardly from the third glass edge on the folding axis is about 50 μm to about 400 μm.

According to one or more embodiments, a display protector attachment kit includes the display protector; and an adhesive solution providable to an edge of the display protector. At this time, the transparent base layer, the first stress relief adhesive layer, and the second stress relief adhesive layer may have a common outer edge, and the common outer edge may be offset inwardly from an edge of the UTG layer.

In some embodiments, a viscosity of the adhesive solution is about 10 cp to about 50 cp at a temperature of about 20° C. to about 25° C.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 2B is a perspective view illustrating a state in which a display protector according to an embodiment of the present disclosure is attached to a rollable display device;

DETAILED DESCRIPTION

Figure 1A:
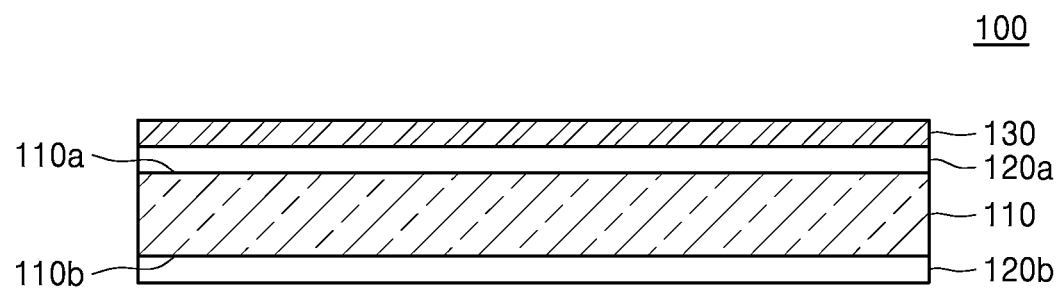
FIG. 1A is a schematic diagram conceptually illustrating a stacked structure of a display protector according to an embodiment of the present disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The present disclosure will now be described more fully with reference to the accompanying drawings, in which exemplary embodiments of the present disclosure are shown. The present disclosure may, however, be embodied in many different forms and should not be construed as being limited to the exemplary embodiments set forth herein. Rather, these embodiments are provided so that this disclosure will be thorough and complete, and will fully convey the concept of the present disclosure to those skilled in the art. Like reference numerals in the drawings denote like elements. Furthermore, various elements and areas in the drawings are schematically drawn. Accordingly, the present disclosure is not limited by the relative size or spacing drawn in the accompanying drawings.

While such terms as "first," "second," etc., may be used to describe various components, such components must not be limited to the above terms. The above terms are used only to distinguish one component from another. For example, without departing from the scope of the present disclosure, a first component may be referred to as a second component, and conversely, the second component may be referred to as a first component.

Terms used in the present disclosure is only used to describe specific embodiments, and are not intended to limit the concept of the present disclosure. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless defined otherwise, all terms used herein have the same meaning as commonly understood by one of ordinary skill in the art to which the present disclosure belongs, including technical and scientific terms. In addition, commonly used terms as defined in the dictionary should be construed as having a meaning consistent with their meaning in the context of the relevant technology, and it will be understood that they should not be construed in an overly formal sense unless explicitly defined herein.

When a certain embodiment may be implemented differently, a specific process order may be performed differently from the described order. For example, two consecutively described processes may be performed substantially at the same time or performed in an order opposite to the described order.

In the accompanying drawings, variations of the illustrated shapes may be expected, for example depending on manufacturing technology and/or tolerances. Accordingly, embodiments of the present disclosure should not be construed as limited to the specific shape of an area shown in the present disclosure, but should include, for example, a change in shape resulting from a manufacturing operation. In addition, a term "substrate" used in the present disclosure may mean a substrate itself, a stacked structure including a substrate and a certain layer or film formed on a surface of the substrate. Also, in the present disclosure, a term "surface of a substrate" may mean an exposed surface of the substrate, or an outer surface of a certain layer or film formed on the substrate.

FIG. 1A is a schematic diagram conceptually illustrating a stacked structure of a display protector 100 according to an embodiment of the present disclosure.

Referring to FIG. 1A, the display protector 100 includes a transparent base layer 110, a first stress relief adhesive layer 120a and a second stress relief adhesive layer 120b respectively provided on two main surfaces of the transparent base layer 110, that is, a first surface 110a and a second surface 110b, and an ultra-thin glass (UTG) layer 130 on the first stress relief adhesive layer 120a.

Transparent Base Layer

The transparent base layer 110 has the first surface 110a and the second surface 110b, which are two main surfaces facing each other.

The transparent base layer 110 may include, for example, a polyurethane resin, a polyester resin, and/or a (meth) acrylic resin.

In some embodiments, the polyurethane resin may have a weight-average molecular weight of about 100,000 to about 3,000,000.

In some embodiments, the polyurethane resin may be a polymerization product of a multifunctional isocyanate compound having two or more isocyanate groups (—N=C=O) and a polyol compound.

The multifunctional isocyanate compound may be an aliphatic, aromatic, alicyclic, or aromatic aliphatic isocyanate compound.

Among multifunctional isocyanate compounds, the aliphatic isocyanate compound may be, for example, at least one selected from ethylene diisocyanate, trimethylene diisocyanate, tetramethylene diisocyanate, hexamethylene diisocyanate (HMDI), octamethylene diisocyanate, nonamethylene diisocyanate, dodecamethylene diisocyanate, 2,2-dimethylpentane diisocyanate, 2,2,4-trimethylhexamethylene diisocyanate, decamethylene diisocyanate, butene diisocyanate, 1,3-butadiene-1,4-diisocyanate, 2,4,4-trimethylhexamethylene diisocyanate, 1,6,11-undecane triisocyanate, 2,2,4-trimethylhexamethylene diisocyanate, lysine diisocyanate, 2,6-diisocyanate methyl caproate, bis(2-isocyanateethyl) fumarate, bis(2-isocyanateethyl) carbonate, 2-isocyanateethyl-2,6-diisocyanate hexanoate, 1,3,5-hexamethylene triisocyanate, 1,8-diisocyanate-4-isocyanate, bis(isocyanatoethyl) ether, 1,4-butylene glycol dipropyl ether-ω,ω'-diisocyanate, lysine diisocyanate methyl ester, 2-isocyanatoethyl-2,6-diisocyanatoethyl-2,6-diisocyanato hexanoate, 2-isocyanato propyl-2,6-diisocyanato hexanoate, 2,6-di(isocyanatomethyl)furan, 1,3-bis(6-isocyanate hexyl)-uretidine-2,4-dione, and 1,3,5-tris(6-isocyanato hexyl)isocyanurate, but the present disclosure is not limited thereto.

Among the multifunctional isocyanate compounds, the aromatic isocyanate compound may be, for example, phenylene 1,4-diisocyanate, tolylene 2,4- and/or 2,6-diisocyanate (TDI), naphthylene 1,5-diisocyanate, diphenylmethane 2,2'- and/or 2,4'-, and/or 4,4'-diisocyanate (MDI), and/or an advanced homologue (pMDI), but the present disclosure is not limited thereto.

Among the multifunctional isocyanate compounds, an alicyclic isocyanate compound may be, for example, at least one selected from isophorone diisocyanate (IPDI), 4,4'-dicyclohexylmethane diisocyanate, cyclohexylene diisocyanate, methylcyclohexylene diisocyanate, bis(2-isocyanateethyl)-4-cyclohexene-1,2-dicarboxylate, 2,5-norbornane diisocyanate, 2,6-norbornane diisocyanate, 2,2-dimethyl dicyclohexylmethane diisocyanate, bis(4-isocyanato-n-butylidene)pentaerythritol, dimer acid diisocyanate, isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-3-(3-isocyanatopropyl)-6-(2-isocyanatoethyl)-bicyclo[2.1.1]-heptane, 2-isocyanatomethyl-2-(3-isocyanatopropyl)-5-(2-isocyanatoethyl)-bicyclo[2.1.1]-heptane, 2-isocyanatomethyl-2-(3-isocyanatopropyl)-6-(2-isocyanatoethyl)-bicyclo[2.2.1]-heptane, and norbornane bis(isocyanatomethyl), but the present disclosure is not limited thereto.

Among the multifunctional isocyanate compounds, the aromatic aliphatic isocyanate compound may be, for example, 1,3-bis(isocyanatomethyl)benzene (m-xylene diisocyanate, m-XDI), 1,4-bis(isocyanatomethyl)benzene (p-xylene diisocyanate, p-XDI), 1,3-bis(2-isocyanatopropan-2-yl)benzene (m-tetramethyl xylene diisocyanate, m-TMXDI), 1,3-bis(isocyanatomethyl)-4-methylbenzene, 1,3-bis(isocyanatomethyl)-4-ethylbenzene, 1,3-bis(isocyanatomethyl)-5-methylbenzene, 1,3-bis(isocyanatomethyl)-4,5-dimethylbenzene, 1,4-bis(isocyanatomethyl)-2,5-dimethylbenzene, 1,4-bis(isocyanatomethyl)-2,3,5,6-tetramethylbenzene, 1,3-bis(isocyanatomethyl)-5-tert-butyl benzene, 1,3-bis(isocyanatomethyl)-4-chlorobenzene, 1,3-bis(isocyanatomethyl)-4,5-dichlorobenzene, 1,3-bis(isocyanatomethyl)-2,4,5,6-tetrachlorobenzene, 1,4-bis(isocyanatomethyl)-2,3,5,6-tetrachlorobenzene, 1,4-bis(isocyanatomethyl)-2,3,5,6-tetrabromobenzene, 1,4-bis(2-isocyanatoethyl)benzene, 1,4-bis(isocyanatomethyl)naphthalene, xylylene diisocyanate, bis(isocyanatoethyl) benzene, bis(isocyanatopropyl)benzene, α,α,α',α'-tetramethyl xylylene diisocyanate, bis(isocyanatobutyl)benzene, bis(isocyanatopropyl)naphthalene, bis(isocyanatomethyl) diphenyl ether, and bis(isocyanatoethyl)phthalate, but the present disclosure is not limited thereto.

The polyol compound may be, for example, ethylene glycol, diethylene glycol, 1,2-propylene glycol, 1,3-butylene glycol, 1,4-butanediol, 1,5-pentanediol, 1,6-hexanediol, 1,9-nonanediol, 1,10-decanediol, 2,2-dimethyl-1,3-propanediol, 1,3-propanediol, 2-methyl-1,3-propanediol, 2,2-dimethyl-1,3-propanediol, 3-methyl-1,5-pentanediol, neopentyl glycol, 2-methyl-1,8-octanediol, dipropylene glycol, or the like, but the present disclosure is not limited thereto.

In some embodiments, the polyester resin may have a weight-average molecular weight of about 100,000 to about 3,000,000.

The polyester resin is a polymer having an ester bond, and is mainly a polycondensate of a polyhydric carboxylic acid and a polyhydric alcohol. As for the polyhydric carboxylic acid used, a divalent dicarboxylic acid is mainly used, including, for example, isophthalic acid, terephthalic acid, dimethyl terephthalate, methyl naphthalenedicarboxylate, or the like. In addition, as for the polyhydric alcohol used, dihydric diol is mainly used, and a description thereof is described above, and thus further description is omitted here.

Particular examples of the polyester resin may include polyethylene terephthalate, polybutylene terephthalate, polyethylene naphthalate, polybutylene naphthalate, polytrimethylene terephthalate, polytrimethylene naphthalate, polycyclohexanedimethyl terephthalate, plycyclohexanedimethyl naphthalate, or the like. A blend rein of the above examples or a copolymer may also be preferably used.

In some embodiments, the (meth) acrylic resin may have a weight-average molecular weight of about 100,000 to about 3,000,000.

The (meth) acrylic resin may be a polymerization product of a (meth)acrylate monomer and/or a (meth)acrylate oligomer.

The (meth)acrylate monomer may be, for example, a multifunctional (meth)acrylate compound. The term 'multifunctional (meth) acrylate compound' may mean a (meth)acrylate compound having two or more polymerizable functional groups.

In particular, the multifunctional (meth)acrylate may be a difunctional actrylate compound such as ethyleneglycol di(meth)acrylate, diethyleneglycol di(meth)acrylate, butanediol di(meth)acrylate, hexanediol di(meth)acrylate, nonanedioldi(meth)acrylate, ethoxylated hexanediol di(meth)acrylate, propoxylated hexanediol di(meth)acrylate, diethyleneglycol di(meth)acrylate, polyethyleneglycol di(meth)acrylate, tripropyleneglycol di(meth)acrylate, polypropyleneglycol di(meth)acrylate, acrylateneopentylglycol di(meth)acrylate, epoxidized neopentylglycol di(meth)acrylate, tripropyleneglycol di(meth)acrylate, polypropyleneglycol di(meth)acrylate, neopentylglycoldi(meth)acrylate, ethoxylated neopentylglycol di(meth)acrylate, tripropyleneglycol di(meth)acrylate, hydroxypivalate neopentylglycol di(meth)acrylate or the like, a trifunctional acrylate compound such as trimethylolpropane tri(meth)acrylate, ethoxylated trimethylolpropane tri(meth)acrylate, propoxylated trimethylolpropane tri(meth)acrylate, tris 2-hydroxyethylisocyanurate tri(meth)acrylate or glycerin tri(meth)acrylate, pentaerythritol tri(meth)acrylate, dipentaerythritol tri(meth)acrylate or ditrimethylolpropane tri(meth)acrylate, or the like, or a multifunctional acrylate compound with more than trifunctionality such as pentaerythritol tetra(meth)acrylate, ditrimethylolpropane tetra(meth)acrylate, dipentaerythritol tetra(meth)acrylate, dipentaerythritol penta(meth)acrylate, ditrimethylolpropane penta(meth)acrylate, dipentaerythritol hexa(meth)acrylate or ditrimethylolpropane hexa (meth)acrylate, or the like, but the present disclosure is not limited thereto.

The (meth)acrylate oligomer may be, for example, epoxy (meth)acrylate, urethane (meth)acrylate, polyester (meth)acrylate, polybutadiene (meth)acrylate, silicone (meth)acrylate, alkyl (meth)acrylate, or the like, but the present disclosure is not limited thereto. In some embodiments, as the (meth)acrylate oligomer, urethane acrylate may be used as a main material to prepare the (meth)acrylic resin.

In some embodiments, as the transparent base layer 110, one of JWR-6, JWR-AEF-01, and JWR-AEF-02 film products, which are commercially available from Jaewon Industry, may be selected and used.

The transparent base layer 110 may have a thickness of about 10 μm to about 40 μm, about 12 μm to about 35 μm, about 14 μm to about 30 μm, about 15 μm to about 25 μm, or any range between these values. In some embodiments, the transparent base layer 110 may have better foldability at a thickness of about 15 μm to about 25 μm.

When the thickness of the transparent base layer 110 is out of the above range and too thin, a mechanical strength may be insufficient, and an effect of preventing glass scattering when a UTG layer is damaged may be insufficient. On the other hand, when the thickness of the transparent base layer 110 is out of the above range and too thick, a shear stress may be excessively concentrated on a folded portion when the display protector 100 is folded, and a lifting phenomenon may easily occur when folding and unfolding are repeated.

In some embodiments, the transparent base layer 110 may have a storage elastic modulus of about 2 GPa to about 6 GPa at −20° C. In some embodiments, the transparent base layer 110 may have a storage elastic modulus of about 2 GPa to about 6 GPa, about 2.2 GPa to about 5.8 GPa, about 2.4 GPa to about 5.6 GPa, about 2.6 GPa to about 5.4 GPa, about 2.8 GPa to about 5.2 GPa, about 3 GPa to about 5 GPa, or any range between these values at −20° C. Hereinafter, 'storage elastic modulus' and 'storage modulus' have the same meaning.

When the storage elastic modulus of the transparent base layer 110 is out of the above range and too small, a restoring force of the display protector 100 may be insufficient, and when the storage elastic modulus of the transparent base layer 110 is out of the above range and too large, a folding characteristic of the display protector 100 may be degraded.

In some embodiments, the transparent base layer 110 may have an elongation of about 30% to about 250%. In some embodiments, the transparent base layer 110 may have an elongation of about 30% to about 250%, about 40% to about 230%, about 50% to about 200%, about 60% to about 190%, about 70% to about 180%, about 80% to about 170%, about 90% to about 160%, about 100% to about 150%, or any range between these values. When the elongation of the transparent base layer 110 is too low, a restoring force of the display protector 100 may be insufficient, and when the elongation of the transparent base layer 110 is too high, a folding characteristic of the display protector 100 may be degraded.

First Stress Relief Adhesive Layer and Second Stress Relief Adhesive Layer

The first stress relief adhesive layer 120a and the second stress relief adhesive layer 120b may each independently include an acrylic polymer or a polysiloxane compound.

The acrylic polymer may be, for example, a polymerization product of a (meth)acrylic monomer.

In particular, the (meth) acrylic monomer may be a monofunctional monomer such as n-butyl(meth)acrylate, 2-butyl(meth)acrylate, t-butyl(meth)acrylate, isobutyl(meth)

acrylate, hexyl(meth)acrylate, cyclohexyl(meth)acrylate, N-vinylpyrrolidone, 2-ethylhexyl(meth)acrylate, ethyl (meth)acrylate, methyl(meth)acrylate, n-propyl(meth)acrylate, isopropyl(meth)acrylate, pentyl(meth)acrylate, n-octyl (meth)acrylate, isooctyl(meth)acrylate, 2-methyl butyl (meth)acrylate, n-nonyl(meth)acrylate, isononyl(meth) acrylate, isoamyl(meth)acrylate, n-decyl(meth)acrylate, isodecyl(meth)acrylate, isobornyl(meth)acrylate, 4-methyl-2-pentyl(meth)acrylate, dodecyl(meth)acrylate, 2-dodecylthioethyl(meth)acrylate, lauryl(meth)acrylate, 2-ethoxyethyl (meth)acrylate, 2-methoxyethyl(meth)acrylate, hydroxyethyl(meth)acrylate, hydroxypropyl(meth)acrylate, hydroxybutyl(meth)acrylate, allyl(meth)acrylate, stearyl (meth)acrylate, phenoxyethyl(meth)acrylate, tetrafurfuryl (meth)acrylate, tetrahydrofuryl(meth)acrylate, acryloylmorpholine, or the like; a difunctional monomer such as 1,3-butanediol di(meth)acrylate, 1,4-butanediol di(meth) acrylate, 1,6-hexanediol di(meth)acrylate, 2-butyl-2-ethyl-1,3-propanedioldiacrylate, 1,9-nonanedioldiacrylate, ethyleneglycol di(meth)acrylate, bisphenol A-ethyleneglycoldiacrylate, diethyleneglycol di(meth)acrylate, triethyleneglycol di(meth)acrylate, tetraethyleneglycol di(meth) acrylate, propyleneglycoldi(meth)acrylate, dipropyleneglycoldi(meth)acrylate, tripropyleneglycol di(meth)acrylate, neopentylglycol di(meth)acrylate, dicyclopentanyl di(meth) acrylate, caprolactone-modified dicyclopentenyl(meth)acrylate, ethylene oxide-modified phosphate di(meth)acrylate, bis(2-hydroxyethyl)isocyanurate di(meth)acrylate, di(acryloxyethyl)isocyanurate, allylated cyclohexyl di(meth)acrylate, dimethyloldicyclopentane diacrylate, ethylene oxide-modified hexahydrophthalic acid diacrylate, tricyclodecanedimethanol acrylate, neopentylglycol-modified trimethylolpropane diacrylate, adamantane diacrylate, or the like; a trifunctional monomer such as trimethylolpropane tri(meth)acrylate, pentaerythritol tri(meth)acrylate, dipentaerythritol tri(meth)acrylate, propionic acid-modified trimethylolpropane tri(meth)acrylate, propylene oxide-modified trimethylolpropane tri(meth)acrylate, tris(2-hydroxyethyl)isocyanurate tri(meth)acrylate, tris(acryloxyethyl)isocyanurate, glycerol tri(meth)acrylate, or the like; a tetrafunctional monomer such as diglycerin tetra(meth)acrylate, pentaerythritoltetra(meth)acrylate, ditrimethylolpropane tetra(meth)acrylate, tetramethylolpropane tetra(meth) acrylate, or the like; a pentafunctional monomer such as dipentaerythritolpenta(meth)acrylate, propionic acid-modified dipentaerythritol penta(meth)acrylate, or the like; or a hexafunctional monomer such as dipentaerythritol hexa(meth)acrylate, caprolactone-modified dipentaerythritol hexa (meth)acrylate, or the like, but the present disclosure is not limited thereto.

The (meth)acrylic monomer may be polymerized together with a comonomer. In some embodiments, the comonomer may include one or more of an alkyl (meth)acrylate monomer, a monomer having an ethylene oxide, a monomer having a propylene oxide, a monomer having an amine group, a monomer having an amide group, a monomer having an alkoxy group, a monomer having a phosphoric acid group, a monomer having a sulfonic acid group, a monomer having a phenyl group, and a monomer having a silane group, but is not limited thereto.

In some embodiments, the alkyl(meth) acrylate monomer may include, for example, an unsubstituted linear or branched alkyl(meth) acrylic acid ester having 1 to 20 carbon atoms. For example, the alkyl (meth) acrylic monomer may include one or more of methyl (meth)acrylate, ethyl (meth)acrylate, propyl (meth)acrylate, n-butyl (meth) acrylate, t-butyl (meth)acrylate, iso-butyl (meth)acrylate, pentyl (meth)acrylate, hexyl (meth)acrylate, heptyl (meth) acrylate, ethylhexyl (meth)acrylate, octyl (meth)acrylate, isooctyl (meth)acrylate, nonyl (meth)acrylate, decyl (meth) acrylate, lauryl (meth)acrylate, and isobornyl (meth)acrylate. In particular, there may be further an effect of increasing an initial adhesive strength by using an alkyl (meth) acrylic monomer having 4 to 8 carbon atoms as a comonomer.

In some embodiments, the monomer having an ethylene oxide may include, for example, one or more (meth)acrylate monomers containing an ethylene oxide group(—$CH_2CH_2O$—). For example, the monomer having an ethylene oxide may be polyethylene oxide alkyl ether (meth) acrylate such as polyethylene oxide monomethyl ether (meth)acrylate, polyethylene oxide monoethyl ether (meth) acrylate, polyethylene oxide monopropyl ether (meth)acrylate, polyethylene oxide monobutyl ether (meth)acrylate, polyethylene oxide monopentyl ether (meth)acrylate, polyethylene oxide dimethyl ether (meth)acrylate, polyethylene oxide diethyl ether (meth)acrylate, polyethylene oxide monoisopropyl ether (meth)acrylate, polyethylene oxide monoisobutyl ether (meth)acrylate, polyethylene oxide mono-tertiary-butyl ether(meth)acrylate, or the like, but is not limited thereto.

In some embodiments, the monomer having a propylene oxide may be, for example, polypropylene oxide alkyl ether (meth)acrylate such as polypropylene oxide monomethyl ether(meth)acrylate, polypropylene oxide monoethyl ether (meth)acrylate, polypropylene oxide monopropyl ether (meth)acrylate, polypropylene oxide monobutyl ether(meth) acrylate, polypropylene oxide monopentyl ether(meth) acrylate, polypropylene oxide dimethyl ether(meth)acrylate, polypropylene oxide diethyl ether(meth)acrylate, polypropylene oxide monoisopropyl ether(meth)acrylate, polypropylene oxide monoisobutyl ether(meth)acrylate, polypropylene oxide mono-tertiary-butyl ether(meth)acrylate, or the like, but is not limited thereto.

In some embodiments, a monomer having an amino group may be, for example, a (meth)acrylic monomer containing an amino group, such as monomethylaminoethyl (meth) acrylate, monoethylaminoethyl (meth)acrylate, monomethylaminopropyl (meth)acrylate, monoethylaminopropyl (meth)acrylate, dimethylaminoethyl (meth)acrylate, diethylaminoethyl (meth)acrylate, N-tert-butylaminoethyl (meth) acrylate, methacryloxyethyltrimethylammonium chloride (meth)acrylate, or the like, but is not limited thereto.

In some embodiments, the monomer having an amide group may be, for example, a (meth)acrylic monomer containing an amide group, such as (meth)acrylamide, N-methylacrylamide, N-methylmethacrylamide, N-methylol(meth)acrylamide, N-methoxymethyl(meth)acrylamide, N,N-methylene bis(meth)acrylamide, 2-hydroxyethyl acrylamide, or the like, but is not limited thereto.

In some embodiments, the monomer having an alkoxyl group may be, for example, 2-methoxyethyl (meth)acrylate, 2-methoxypropyl (meth)acrylate, 2-ethoxypropyl (meth) acrylate, 2-butoxypropyl (meth)acrylate, 2-methoxypentyl (meth)acrylate, 2-ethoxypentyl (meth)acrylate, 2-butoxyhexyl (meth)acrylate, 3-methoxypentyl (meth)acrylate, 3-ethoxypentyl (meth)acrylate, 3-butoxyhexyl (meth)acrylate, but is not limited thereto.

In some embodiments, the monomer having a phosphoric acid group may be, for example, an acrylic monomer having a phosphoric acid group, such as 2-methacryloyloxyethyl diphenyl phosphate (meth)acrylate, tri methacryloyloxyethyl phosphate (meth)acrylate, tricryloyloxyethyl phosphate (meth)acrylate, or the like, but is not limited thereto.

In some embodiments, the monomer having a sulfonic acid group may be, for example, an acrylic monomer having a sulfonic acid group, such as sodium sulfopropyl (meth) acrylate, sodium 2-sulfoethyl (meth)acrylate, sodium 2-acrylamido-2-methylpropanesulfonate, or the like, but is not limited thereto.

In some embodiments, the monomer having a phenyl group may be, for example, an acrylic vinyl monomer having a phenyl group, such as p-tert-butylphenyl (meth) acrylate, o-biphenyl (meth)acrylate, or the like, but is not limited thereto.

In some embodiments, the monomer having a silane group may be, for example, a vinyl monomer having a silane group, such as 2-acetoacetoxyethyl (meth)acrylate, vinyltrimethoxysilane, vnyltriethoxysilane, vinyl tris(β-methoxyethyl)silane, vinyltriacetylsilane, methacryloyloxy propyltrimethoxysilane, or the like, but is not limited thereto.

The comonomer may be included in an amount of about 60% to about 95% by weight, for example, about 70% to about 90% by weight of a monomer mixture. In the above range, the first stress relief adhesive layer 120a and the second stress relief adhesive layer 120b may obtain an excellent adhesive strength and stress dissipation effect.

The acrylic polymer may have a weight-average molecular weight of about 100,000 to about 3,000,000.

The polysiloxane compound may be, for example, a polysiloxane compound of Formula 1 below.

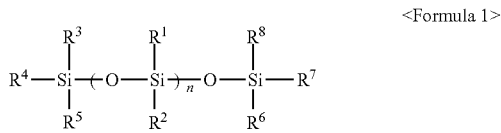

<Formula 1>

(wherein, n is an integer from 100 to 10,000, $R^1$ to $R^8$ are each independently hydrogen, halogen, a nitrile group, a nitro group, an hydroxyl group, an amino group, a substituted or unsubstituted alkyl group having 1 to 10 carbon atoms, a substituted or unsubstituted alkoxy group having 1 to 10 carbon atoms, a substituted or unsubstituted alkenyl group having 2 to 10 carbon atoms, a substituted or unsubstituted alkynyl group having 2 to 10 carbon atoms, a substituted or unsubstituted alkylenyl group having 2 to 10 carbon atoms, a substituted or unsubstituted cycloalkyl group having 3 to 15 carbon atoms, a substituted or unsubstituted aryl group having 6 to 15 carbon atoms, a substituted or unsubstituted aryloxy group having 6 to 15 carbon atoms, a substituted or unsubstituted arylalkyl group having 7 to 15 carbon atoms, or a substituted or unsubstituted alkylaryl group having 7 to 15 carbon atoms.

Here, 'substituted' means that a hydrogen atom bonded to a carbon atom of a compound or functional group is changed to another substituent, a position to be substituted is a position at which a hydrogen atom is substituted, and is not particularly limited as long as it is a position substitutable by a substituent. In addition, when two or more substituents are substituted, the two or more substituents may be the same as or different from each other.

Here, "substituted or unsubstituted" means being substituted with one or two or more substituents selected from a group consisting of deuterium; halogen; a nitrile group (—CN); a nitro group; a hydroxyl group; an amino group; a silyl group; a boron group; an alkoxy group; an aryloxy group; an alkyl group; a cycloalkyl group; an aryl group; and a heterocyclic group, substituted with a substituent in which two or more substituents among the substituents stated above are connected, or not having any substituents. For example, the 'substituent in which two or more substituents are connected' may be a biphenyl group. That is, the biphenyl group may be an aryl group or may be interpreted as a substituent in which two phenyl groups are connected.

The first stress relief adhesive layer 120a and the second stress relief adhesive layer 120b may each independently have a thickness of about 10 μm to about 40 μm, about 11 μm to about 38 μm, about 12 μm to about 36 μm, about 13 μm to about 34 μm, about 14 μm to about 32 μm, about 15 μm to about 30 μm, or any range between these values. The display protector 100 may have the best foldability when each of the first stress relief adhesive layer 120a and the second stress relief adhesive layer 120b has a thickness of about 15 μm.

When the thickness of each of the first stress relief adhesive layer 120a and the second stress relief adhesive layer 120b is out of the above range and too thin, an effect of relieving stress may be insufficient, and peeling (lifting) may occur. On the other hand, when the thickness of each of the first stress relief adhesive layer 120a and the second stress relief adhesive layer 120b is out of the above range and too thick, the stress of folding may be withstood, but a stress generated on both surfaces of a stress relief adhesive layer becomes excessively unbalanced, and peeling (lifting) of a folding portion may occur.

In some embodiments, the first stress relief adhesive layer 120a and the second stress relief adhesive layer 120b may each independently have a storage modulus of about 0.1 MPa to about 0.5 MPa at −20° C. In some embodiments, the first stress relief adhesive layer 120a and the second stress relief adhesive layer 120b may each independently have a storage modulus of about 0.1 MPa to about 0.5 MPa, about 0.12 MPa to about 0.48 MPa, about 0.14 MPa to about 0.46 MPa, about 0.16 MPa to about 0.44 MPa, about 0.18 MPa to about 0.42 MPa, about 0.2 MPa to about 0.4 MPa, about 0.25 MPa to about 0.35 MPa, or any range between these values at −20° C.

The first stress relief adhesive layer 120a and the second stress relief adhesive layer 120b may each independently have a storage elastic modulus of about 0.03 MPa to about 0.2 MPa at −10° C. In some embodiments, the first stress relief adhesive layer 120a and the second stress relief adhesive layer 120b may each independently have a storage elastic modulus of about 0.03 MPa to about 0.20 MPa, about 0.04 MPa to about 0.18 MPa, about 0.05 MPa to about 0.16 MPa, about 0.06 MPa to about 0.14 MPa, about 0.07 MPa to about 0.12 MPa, about 0.08 MPa to about 0.11 MPa, about 0.08 MPa to about 0.10 MPa, about 0.08 MPa to about 0.15 MPa, about 0.1 MPa to about 0.15 MPa, or any range between these values at −10° C.

Also, the first stress relief adhesive layer 120a and the second stress relief adhesive layer 120b may each independently have a storage modulus of about 0.02 MPa to about 0.2 MPa at +40° C. In some embodiments, the first stress relief adhesive layer 120a and the second stress relief adhesive layer 120b may each independently have a storage modulus of about 0.02 MPa to about 0.20 MPa, about 0.03 MPa to about 0.18 MPa, about 0.04 MPa to about 0.16 MPa, about 0.05 MPa to about 0.14 MPa, about 0.06 MPa to about 0.13 MPa, about 0.07 MPa to about 0.12 MPa, about 0.08 MPa to about 0.11 MPa, about 0.09 MPa to about 0.10 MPa, about 0.05 MPa to about 0.15 MPa, and more preferably, about 0.05 MPa to about 0.10 MPa, or any range between these values at +40° C.

When the storage modulus of each of the first stress relief adhesive layer 120a and the second stress relief adhesive layer 120b is out of the above range and too small, physical characteristics of a material of each of the first stress relief adhesive layer 120a and the second stress relief adhesive layer 120b may be excessively soft, making it difficult to manufacture, and peeling (lifting) may occur during folding due to a decrease in adhesive strength.

On the other hand, when the storage modulus of each of the first stress relief adhesive layer 120a and the second stress relief adhesive layer 120b is out of the above range and too large, an effect of relieving shear stress generated in the display protector 100 with respect to transformation of the display protector 100 is insufficient.

In some embodiments, a storage modulus of the first stress relief adhesive layer 120a may be substantially equal to a storage modulus of the second stress relief adhesive layer 120b. Here, "substantially equal" means that a difference between two values is within +/−10% based on a larger value of the two values. In some embodiments, the first stress relief adhesive layer 120a and the second stress relief adhesive layer 120b may have substantially the same storage elastic modulus.

In other embodiments, the first stress relief adhesive layer 120a and the second stress relief adhesive layer 120b may have different storage elastic moduli from each other.

In embodiments, the first stress relief adhesive layer 120a and the second stress relief adhesive layer 120b may each independently have an adhesive strength of about 600 g/in to about 1,500 g/in at a temperature of about 20° C. to about 25° C. In some embodiments, the first stress relief adhesive layer 120a and the second stress relief adhesive layer 120b may each independently have an adhesive strength of about 600 g/in to about 1,500 g/in, about 650 g/in to about 1,450 g/in, about 700 g/in to about 1,400 g/in, about 750 g/in to about 1,350 g/in, about 800 g/in to about 1,300 g/in, about 850 g/in to about 1,250 g/in, about 900 g/in to about 1,200 g/in, about 950 g/in to about 1,150 g/in, about 1,000 g/in to about 1,110 g/in, or any range between these values.

When the adhesive strength of each of the first stress relief adhesive layer 120a and the second stress relief adhesive layer 120b is out of the above range and too small, the adhesive strength is insufficient and an attachment to a display protector is difficult to maintain.

On the other hand, when the adhesive strength of each of the first stress relief adhesive layer 120a and the second stress relief adhesive layer 120b is out of the above range and too large, the display protector 100 is difficult to peel from an attached electronic device when needed to be replaced, and there is a risk of damaging an electronic device display during peeling.

UTG Layer

The UTG layer may be a layer formed of a tempered glass material having a thickness of about 25 micrometers (μm) to about 70 μm. In some embodiments, the UTG layer 130 may have a thickness of about 25 μm to about 70 μm, about of about 30 μm to about 70 μm, about 32 μm to about 70 μm, about 34 μm to about 65 μm, about 36 μm to about 60 μm, about 38 μm to about 55 μm, about 40 μm to about 50 μm, about 25 μm to about 65 μm, about 25 μm to about 60 μm, about 25 μm to about 55 μm, about 25 μm to about 50 μm, or any range between these values.

When the thickness of the UTG layer 130 is out of the above range and too thin, an impact resistance may be insufficient. When the thickness of the UTG layer 130 is out of the above range and too thick, the UTG layer 130 may be easily damaged by repeated folding or rolling, and a repulsive force becomes strong when folding. In particular, a repulsive force may be excessively generated when the UTG layer 130 has a thickness exceeding 50 μm in some cases.

The UTG layer 130 may include, for example, aluminosilicate, alkali-aluminosilicate, borosilicate, alkali-borosilicate, aluminoborosilicate, alkali-aluminoborosilicate, soda-lime, or other suitable glass, but is not limited thereto. In some embodiments, the UTG layer 130 may be obtained from mother glass that is commercially available from NEG company, Corning Inc., Schott company, or the like.

The mother glass is formed into the UTG layer 130 by being subjected to a sliming operation, a cell-shaped cutting operation, a glass strengthening operation, an anti-fingerprint (AF) coating operation, or the like. Additionally, a shatterproof coating operation may also be applied.

Figure 1B:
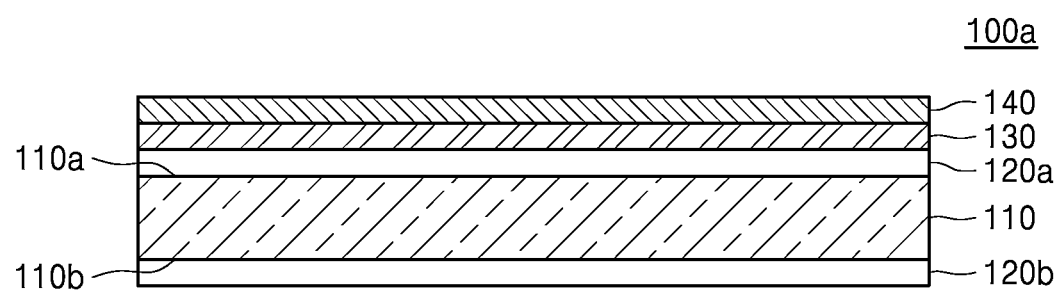
FIG. 1B is a schematic diagram conceptually illustrating a stacked structure of a display protector according to another embodiment of the present disclosure.

FIG. 1B is a schematic diagram conceptually illustrating a stacked structure of a display protector 100a according to another embodiment of the present disclosure. The display protector 100a is substantially the same as the display protector 100 described with reference to FIG. 1A except that a scattering prevention coating layer 140 is further included. Accordingly, differences thereof will be mainly described below, and detailed descriptions of the rest are omitted.

Referring to FIG. 1B, the display protector 100a further includes the scattering prevention coating layer 140 on the UTG layer 130. Although an example in which the scattering prevention coating layer 140 is provided on an upper surface of the UTG layer 130 is illustrated in FIG. 1B, the scattering prevention coating layer 140 may also be provided on a lower surface of the UTG layer 130. In another embodiment, the scattering prevention coating layer 140 may be provided on the upper surface and the lower surface of the UTG layer 130.

The scattering prevention coating layer 140 is an ultraviolet (UV) curable resin and may have a thickness of about 5 μm to about 30 μm.

The UV curable resin includes a product produced by polymerization of a monomer and/or an oligomer initiated by a photoinitiator. The photoinitiator may serve to initiate polymerization of a monomer and/or an oligomer by UV irradiation.

As the monomer, for example, an epoxy monomer, a vinyl ether, a cyclic ether, an acrylic monomer, or the like, may be used. The oligomer may be a (meth)acrylate oligomer, a polyester (meth)acrylate oligomer, an acrylic (meth)acrylate oligomer, a polyurethane (meth)acrylate oligomer, an epoxy acrylate oligomer, a silicone acrylate oligomer, or the like, but is not limited thereto.

As the photoinitiator may include, for example, a benzoin-based, hydroxyketone-based, aminoketone-based, or phosphine oxide-based photoinitiator may be used. In particular, examples of the photoinitiator may include benzoin, benzoin methyl ether, benzoin ethyl ether, benzoin isopropyl ether, benzoin n-butyl ether, benzoin isobutyl ether, acetophenone, dimethylamino acetophenone, 2,2-dimethoxy-2-phenyl acetophenone, 2,2-diethoxy-2-phenyl acetophenone, 2-hydroxy-2-methyl-1-phenylpropan-1-one, 1-hydroxycyclohexyl phenyl ketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenyl benzophenone, 4,4-non cydiethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylamino benzoic acid ester, oligo [2-hydroxy-2-methyl-1-[4-(1-methylvinyl)phenyl]pro-panone], 2,4,6-trimethylbenzoyl-diphenyl-phosphine oxide, or the like. In the present disclosure, one or more of the above may be used, but the present disclosure is not limited thereto.

The UV curable resin may be a fluid having a viscosity of about 100 cps to about 8000 cps at a temperature of about 20° C. to about 25° C., and may be coated by a method such as spin coating or doctor blade. Thereafter, the scattering prevention coating layer 140 may be formed by curing by irradiating UV.

Figure 2A:
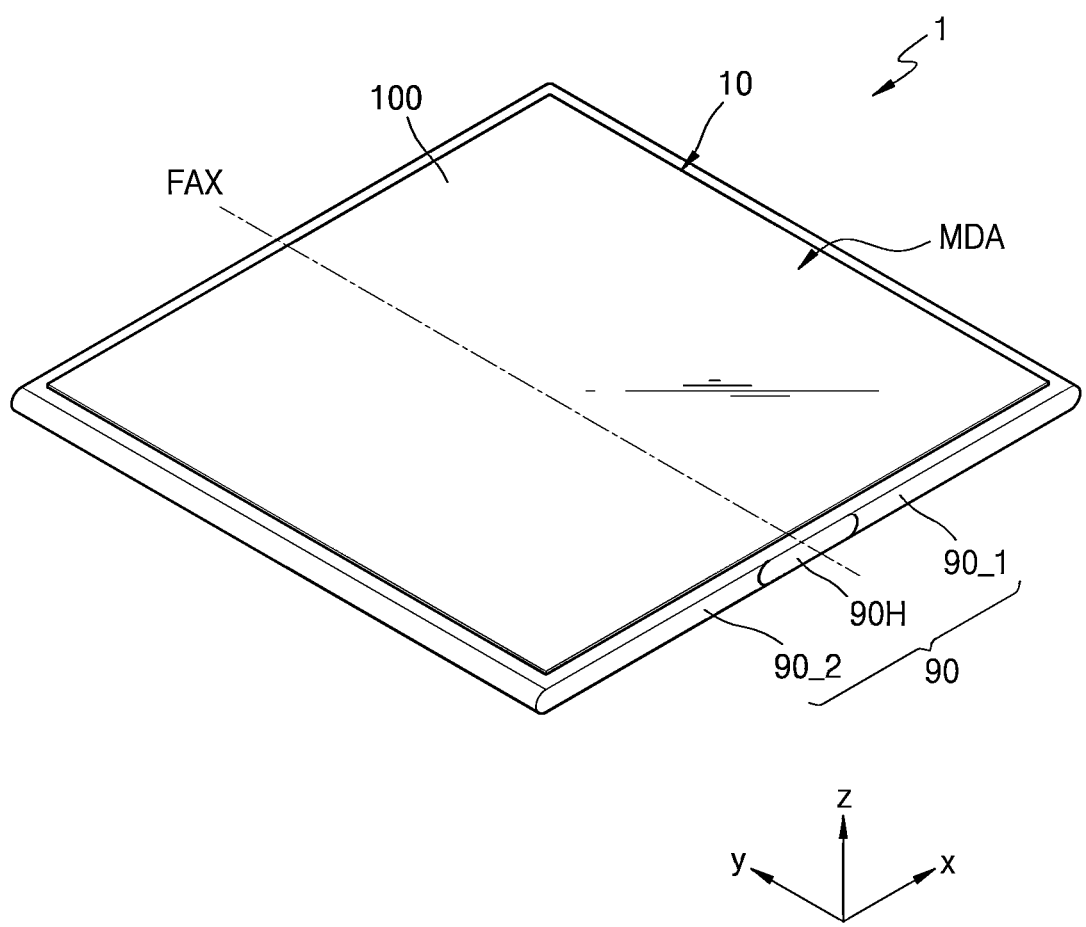
FIG. 2A is a perspective view illustrating a state in which a display protector according to an embodiment of the present disclosure is attached to a foldable display device.

FIG. 2A is a perspective view illustrating a state in which the display protector 100 according to an embodiment of the present disclosure is attached to a foldable display device 1.

Referring to FIG. 2A, the foldable display device 1 may include a display panel 10 and a lower cover 90. The lower cover 90 may include a first portion 90_1 and a second portion 90_2, which support the display panel 10. The lower cover 90 may be folded around a folding axis FAX between the first portion 90_1 and the second portion 90_2. In an embodiment, a hinge portion 90H may be included between the first portion 90_1 and the second portion 90_2. In addition, in an embodiment, the second portion 90_2 may include a transparent material.

The display protector 100 may be provided to cover at least a portion of the display panel 10.

When the foldable display device 1 is folded around the folding axis FAX, the display protector 100 is also folded together. At this time, a folded portion of the display protector 100 has a radius of curvature of about 0.5 mm to about 1.3 mm. Accordingly, the UTG layer 130 (refer to FIG. 1A) of the display protector 100 may be tempered glass configured not to be damaged even with a radius of curvature of 0.5 mm, 0.6 mm, 0.7 mm, 0.8 mm, 0.9 mm, 1.0 mm, 1.1 mm, 1.2 mm, and 1.3 mm.

In some embodiments, an AF coating may be further provided on a surface of the UTG layer 130 (see FIG. 1A).

FIG. 2B is a perspective view illustrating a state in which the display protector 100 according to an embodiment of the present disclosure is attached to a rollable display device 2.

Referring to FIG. 2B, the rollable display device 2 may include the display panel 10, a roller unit 20, a housing portion 30, a module portion BP, and a space adjusting unit L.

The display panel 10 may be a flexible display panel that is flexible and may be easily bent, folded, or rolled. In particular, the display panel 10 may be a rollable display panel which may be rolled or unrolled.

The display panel 10 may be rolled or unrolled by the roller unit 20. For example, when the display panel 10 is rolled on the roller unit 20, the display panel 10 may be exposed by the housing portion 30 by a first interval in a first direction (e.g., +x direction or −x direction) of the display panel 10. When the display panel 10 is unrolled around the roller unit 20, the display panel 10 may be exposed by the housing portion 30 by a second interval greater than the first interval in the first direction (e.g., +x direction or −x direction) of the display panel 10. Accordingly, a size of the display panel 10 exposed by the housing portion 30 and recognized by a user may be changed.

The roller unit 20 may roll the display panel 10. Alternatively, the roller unit 20 may unroll the display panel 10. In some embodiments, the roller unit 20 may be connected to a driving unit. At this time, the driving unit may include a motor or the like, and may rotate the roller unit 20. Alternatively, the roller unit 20 may manually roll or unroll the display panel 10.

In an embodiment, the roller unit 20 may include a first roller unit 20A and a second roller unit 20B. The first roller unit 20A and the second roller unit 20B may be spaced apart from each other in the first direction (e.g., +x direction or −x direction). In some embodiments, one of the first roller unit 20A and the second roller unit 20B may be omitted.

The housing portion 30 may accommodate the roller unit 20. Accordingly, a portion of the display panel 10 may be accommodated in the housing portion 30. A portion of the display panel 10 may be brought into the housing portion 30 or may be taken out of the housing portion 30. The housing portion 30 may include a curved portion. Accordingly, the user may easily grip the housing portion 30.

In an embodiment, the housing portion 30 may include a first housing portion 30A and a second housing portion 30B. The first housing portion 30A and the second housing portion 30B may be spaced apart from each other in the first direction (e.g., +x direction or −x direction). In some embodiments, one of the first housing portion 30A and the second housing portion 30B may be omitted. The first housing portion 30A may accommodate the first roller unit 20A. The second housing portion 30B may accommodate the second roller unit 20B.

The display protector 100 may be provided to cover at least a portion of the display panel 10. In particular, the display protector 100 may be rolled together with the display panel 10 when the display panel 10 is rolled.

When the rollable display device 2 is folded around the folding axis FAX, the display protector 100 is also folded. At this time, a folded portion of the display protector 100 has a radius of curvature of about 0.5 mm to about 1.3 mm. Accordingly, the UTG layer 130 (see FIG. 1A) of the display protector 100 may be tempered glass configured not to be damaged even with a radius of curvature of 0.5 mm, 0.6 mm, 0.7 mm, 0.8 mm, 0.9 mm, 1.0 mm, 1.1 mm, 1.2 mm, and 1.3 mm.

In some embodiments, an AF coating may be further provided on a surface of the display protector 100, and more particularly, on a surface of the UTG layer 130 (see FIG. 1A).

Hereinafter, configurations and effects of the present disclosure will be described in more detail with reference to particular embodiments and comparative examples, but these embodiments are only for clear understanding of the present disclosure and are not intended to limit the scope of the present disclosure.

<Folding Reliability Test>

After attaching a display protector manufactured according to each recipe to a foldable device, a test of repeating folding and unfolding at room temperature (about 20° C. to about 25° C.) was performed.

The test was performed according to a procedure shown in Table 1 below. That is, first to fourth rounds are sequentially performed, and each round is sequentially performed from step A to step D. Each number in Table 1 is a number of repeated folding and unfolding, 'OUT state' means an unfolded state, and 'IN state' means a folded state.

After performing all the first to fourth rounds, a case where there is no lifting at all was indicated by ⊚, a case where a size of lifting is less than 10 mm was indicated by ○, and a case where the size of lifting is 10 mm or more was indicated by X.

TABLE 1

|  | STEP A | STEP B | STEP C | STEP D |
|---|---|---|---|---|
| FIRST ROUND | 150 TIMES IMMEDIATELY UPON ATTACHMENT | 30 TIMES AFTER ATTACHMENT AND LEAVING ALONE FOR 5 MINUTES IN "OUT" STATE | 30 TIMES AFTER ATTACHMENT AND LEAVING ALONE FOR 5 MINUTES IN "IN" STATE | 30 TIMES AFTER ATTACHMENT AND LEAVING ALONE FOR 5 MINUTES IN "IN" STATE AT 0° C. |
| SECOND ROUND | 300 TIMES IMMEDIATELY UPON ATTACHMENT | 60 TIMES AFTER ATTACHMENT AND LEAVING ALONE FOR 10 MINUTES IN "OUT" STATE | 60 TIMES AFTER ATTACHMENT AND LEAVING ALONE FOR 10 MINUTES IN "IN" STATE | 60 TIMES AFTER ATTACHMENT AND LEAVING ALONE FOR 10 MINUTES IN "IN" STATE AT −5° C. |
| THIRD ROUND | 600 TIMES IMMEDIATELY UPON ATTACHMENT | 300 TIMES AFTER ATTACHMENT AND LEAVING ALONE FOR 10 MINUTES IN "OUT" STATE | 300 TIMES AFTER ATTACHMENT AND LEAVING ALONE FOR 10 MINUTES IN "IN" STATE | 300 TIMES AFTER ATTACHMENT AND LEAVING ALONE FOR 10 MINUTES IN "IN" STATE AT −10° C. |
| FOURTH ROUND | 8000 TIMES IMMEDIATELY UPON ATTACHMENT | | | |

<Stress Relief Adhesive Layer Test>

The folding reliability test was performed by using a polyurethane film having a thickness of 12 μm as a base and changing a thickness and an adhesive strength of each of first and second stress relief adhesive layers. As a result, results shown in Table 2 below were obtained.

TABLE 2

|  | ADHESIVE STRENGTH (g/in) | THICKNESS OF STRESS RELIEF ADHESIVE LAYER (μm) | RESULT |
|---|---|---|---|
| COMPARATIVE EXAMPLE 1 | 400 | 25 | X |
| COMPARATIVE EXAMPLE 2 |  | 35 | X |
| COMPARATIVE EXAMPLE 3 |  | 50 | X |
| EXAMPLE 1 | 600 | 25 | ⊚ |
| EXAMPLE 2 |  | 35 | ⊚ |
| COMPARATIVE EXAMPLE 4 |  | 50 | X |
| EXAMPLE 3 | 1200 | 25 | ⊚ |
| EXAMPLE 4 |  | 35 | ⊚ |
| EXAMPLE 5 |  | 50 | ○ |
| EXAMPLE 6 | 1500 | 25 | ⊚ |
| EXAMPLE 7 |  | 35 | ⊚ |
| EXAMPLE 8 |  | 50 | ⊚ |
| COMPARATIVE EXAMPLE 5 | 1700 | 25 | X |
| COMPARATIVE EXAMPLE 6 |  | 35 | X |

Figure 3A:
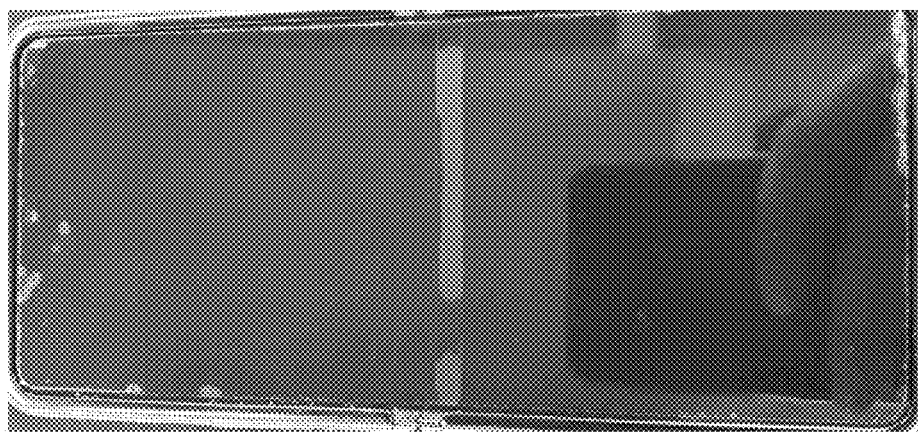
FIG. 3A to 6 are images illustrating folding reliability test results according to embodiments of the present disclosure and comparative examples.

As shown in Table 2, when the adhesive strength of each of the first and second stress relief adhesive layers was less than 600 g/in (Comparative Examples 1 to 3), lifting occurred as a result of the folding reliability test (refer to FIG. 3A). In addition, when the adhesive strength of each of the first and second stress relief adhesive layers exceeded 1,500 g/in (Comparative Examples 5 and 6), the display protector was very difficult to detach from the foldable device, and a surface of the foldable device was partially damaged.

Figure 3B:
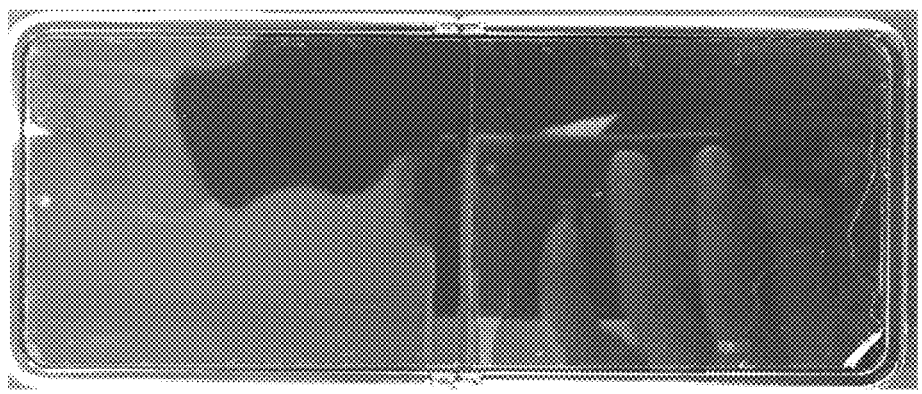

When the thickness of each of the first and second stress relief adhesive layers was 50 μm, the folding reliability test result was generally good, but when the adhesive strength of the first and second stress relief adhesive layers was 600 g/in (Comparative Example 4), lifting occurred (refer to FIG. 3B).

Figure 3C:
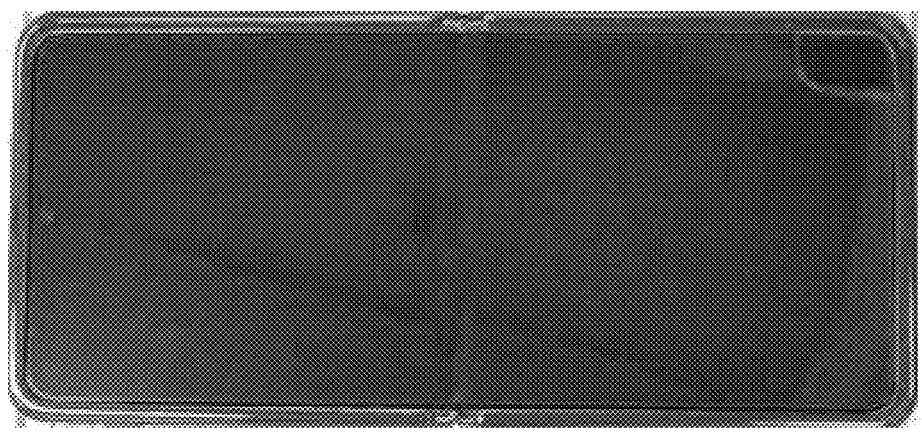

However, when the adhesive strength of each of the first and second stress relief adhesive layers ranges from 600 g/in to 1,500 g/in, and the thicknesses of the first and second stress relief adhesive layers are each 25 μm and 35 μm, an excellent folding reliability test result was obtained without lifting (refer to FIG. 3C).

<Transparent Base Layer Test>

The folding reliability test was performed by forming an acrylic optically clear adhesive (OCA) layer having a thickness of 25 μm as each of the first and second stress relief adhesive layers and changing a thickness of a polyurethane transparent base layer. As a result, results shown in Table 3 were obtained.

TABLE 3

|  | ADHESIVE STRENGTH (g/in) | THICKNESS OF TRANSPARENT BASE LAYER (μm) | TEST RESULT |
|---|---|---|---|
| COMPARATIVE EXAMPLE 7 | 400 | 12 | X |
| COMPARATIVE EXAMPLE 8 |  | 19 | X |
| COMPARATIVE EXAMPLE 9 |  | 25 | X |
| EXAMPLE 9 | 600 | 12 | ⊚ |
| COMPARATIVE EXAMPLE 10 |  | 19 | X |
| EXAMPLE 10 |  | 25 | ○ |
| EXAMPLE 11 | 1200 | 12 | ⊚ |
| EXAMPLE 12 |  | 19 | ⊚ |
| EXAMPLE 13 |  | 25 | ⊚ |
| EXAMPLE 14 | 1500 | 12 | ⊚ |
| EXAMPLE 15 |  | 19 | ⊚ |
| EXAMPLE 16 |  | 25 | ⊚ |

Figure 4:
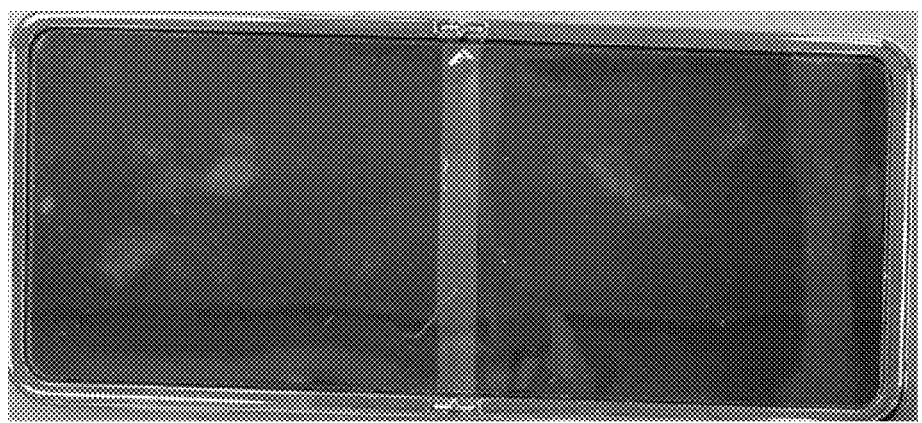

As shown in Table 3, even when the thickness of the transparent base layer is changed, when the adhesive strength of each of the first and second stress relief adhesive layers is less than 600 g/in (Comparative Examples 7 to 9), lifting occurred as a result of the folding reliability test (refer to FIG. 4).

<UTG Layer Test>

The folding reliability test was performed by using an acrylic OCA layer having a thickness of 25 μm and an adhesive strength of 600 g/in as each of the first and second stress relief adhesive layers, using a polyurethane transparent base layer having a thickness of 12 μm as a transparent base layer, and manufacturing a display protector by forming a UTG layer of various thicknesses (30 μm, 50 μm, and 75 μm) thereon. As a result, when UTG layers having thicknesses of 30 μm and 50 μm were used, there was no lifting or damage to the UTG layer, but when a UTG layer having a thickness of 75 μm was used, both lifting and damage of the UTG layer were observed, and it was difficult to maintain the foldable device in an L-shape.

<Combination of Stress Relief Adhesive Layers>

By using a polyurethane transparent base layer having a thickness of 12 μm as a transparent base layer and providing first and second stress relief adhesive layers, which are the same or different from each other, on both surfaces of the polyurethane transparent base layer, the folding reliability test was performed and lifting was observed. A thickness of a UTG layer was 30 μm, and the test results are summarized in Table 4 below.

TABLE 4

|  | COMPARATIVE EXAMPLE 11 | COMPARATIVE EXAMPLE 12 | EXAMPLE 17 | EXAMPLE 18 |
|---|---|---|---|---|
| UTG LAYER |  | 30 μm |  |  |
| FIRST STRESS RELIEF ADHESIVE LAYER | FOCA A | FOCA B | FOCA A | FOCA B |
| TRANSPARENT BASE LAYER |  | 12 μm |  |  |
| SECOND STRESS RELIEF ADHESIVE LAYER | FOCA B | FOCA A | FOCA A | FOCA B |
| TEST RESULT | X | ○ | ⊚ | ⊚ |

In Table 4, FOCA A is an acrylic OCA having a storage modulus of 0.1 MPa at 25° C., and FOCA B is an acrylic OCA having a storage modulus of 0.05 MPa at 25° C.

Figure 5A:
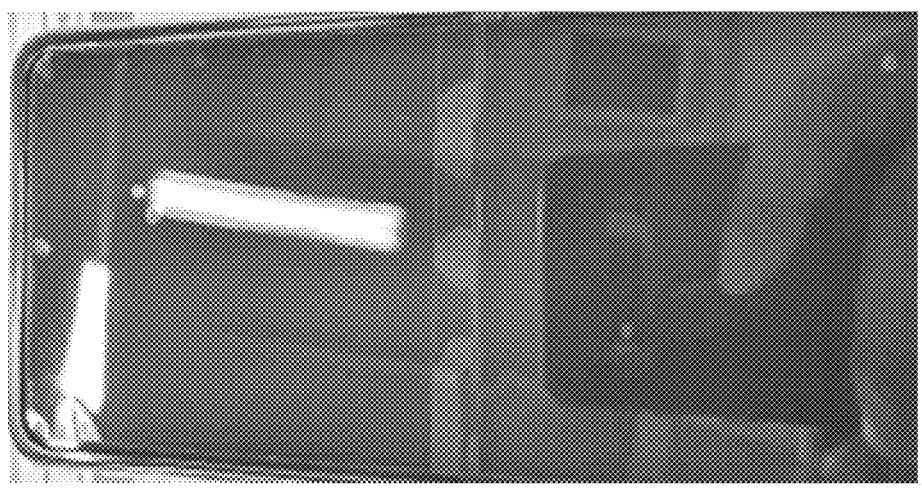
Figure 5B:
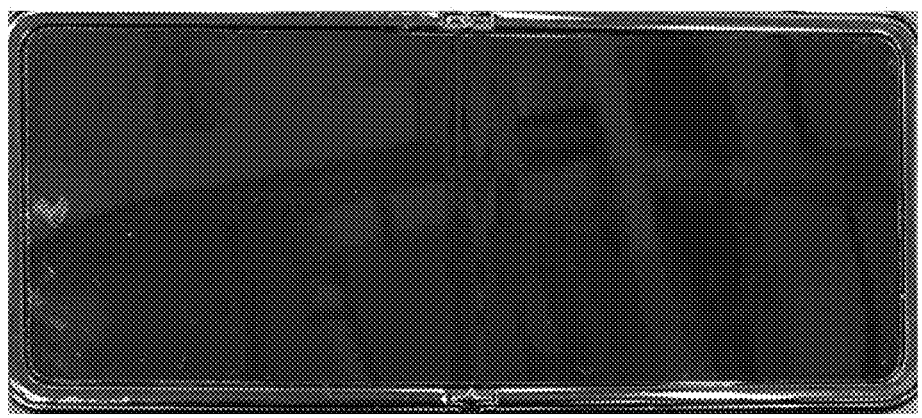

As shown in Table 4, when a storage modulus of the first stress relief adhesive layer is greater than a storage modulus of the second stress relief adhesive layer (Comparative Example 11), lifting occurred (refer to FIG. 5A). On the other hand, when the storage modulus of the first stress relief adhesive layer is less than the storage modulus of the second stress relief adhesive layer (Comparative Example 12), it was confirmed that a degree of the occurrence of lifting was alleviated. When the storage modulus of the first stress relief adhesive layer is substantially identical to the storage modulus of the second stress relief adhesive layer (Embodiments 17 and 18), it was confirmed that this combination is the most effective against lifting (refer to FIG. 5B).

<A Storage Modulus of a Stress Relief Adhesive Layer>

The folding reliability test was performed while changing a storage modulus of each of the first and second stress relief adhesive layers at 40° C., and lifting was observed. Results of the test are summarized in Table 5 below.

TABLE 5

|  | STORAGE MODULUS (MPa) | TEST RESULT |
|---|---|---|
| EXAMPLE 19 | 0.02 | ⊚ |
| EXAMPLE 20 | 0.05 | ⊚ |
| EXAMPLE 21 | 0.10 | ⊚ |
| EXAMPLE 22 | 0.15 | ⊚ |
| EXAMPLE 23 | 0.20 | ⊚ |
| COMPARATIVE EXAMPLE 13 | 0.25 | X |
| COMPARATIVE EXAMPLE 14 | 0.30 | X |
| COMPARATIVE EXAMPLE 15 | 0.35 | X |

Figure 6:
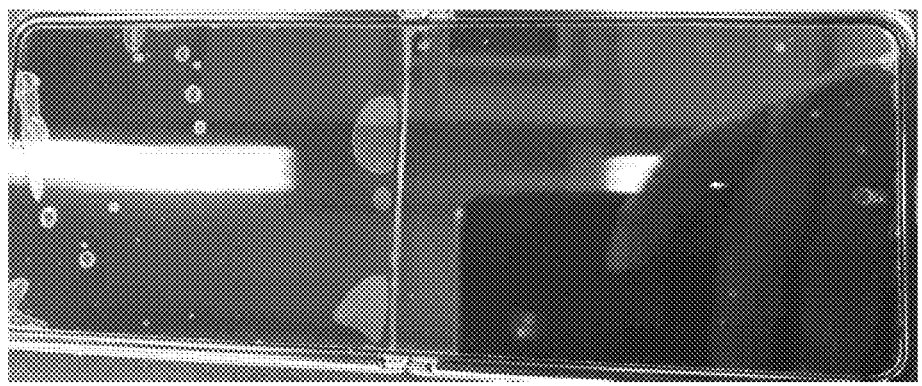

As shown in Table 5, when the storage modulus of each of the first and second stress relief adhesive layers is 0.2 MPa or less, excellent folding reliability was shown, but when the storage modulus of each of the first and second stress relief adhesive layers is 0.25 MPa or more, a lifting phenomenon was observed (refer to FIG. 6).

Figure 7:
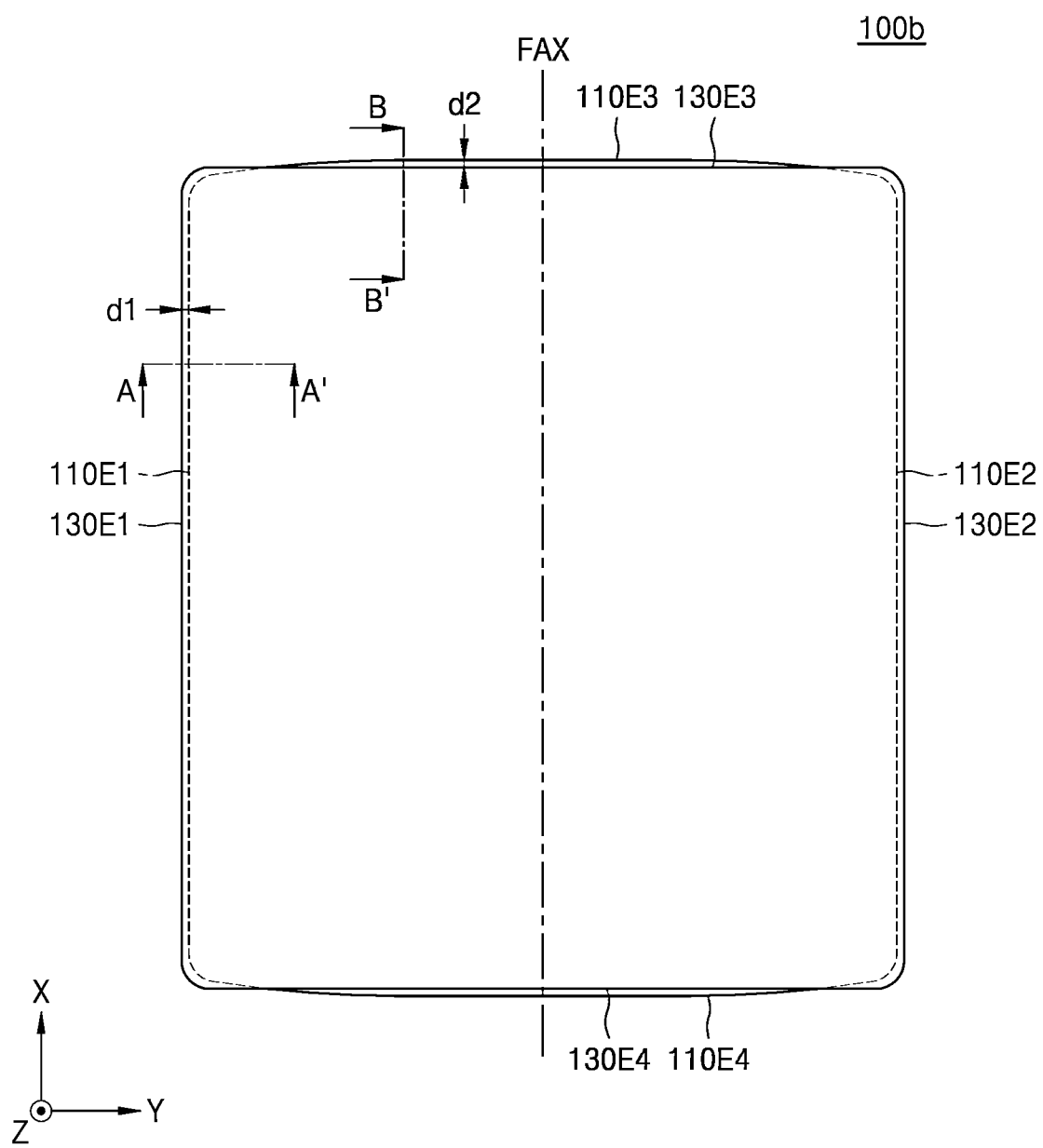
FIG. 7 is a schematic diagram illustrating a display protector according to an embodiment of the present disclosure.
Figure 8A:
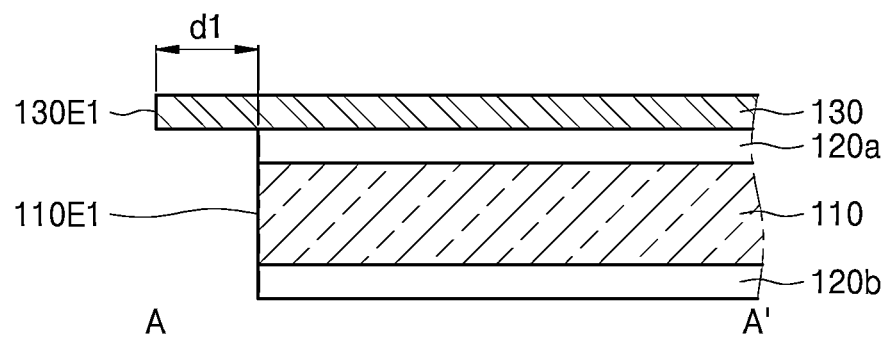
FIGS. 8A and 8B are cross-sectional views taken along lines A-A' and B-B' of FIG. 7, respectively.
Figure 8B:
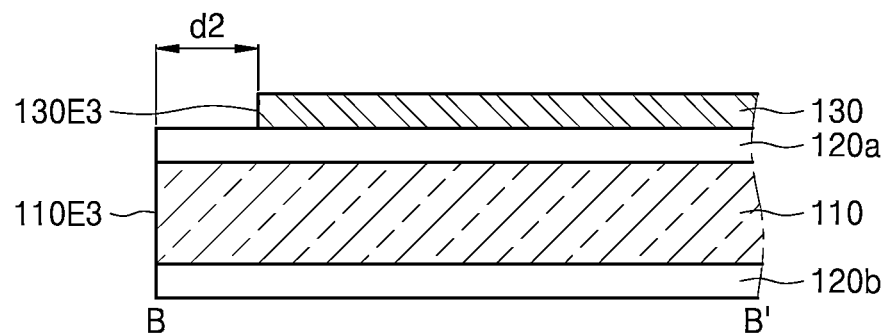

FIG. 7 is a schematic diagram illustrating a display protector 100b according to an embodiment of the present disclosure. FIGS. 8A and 8B are cross-sectional views taken along lines A-A' and B-B' of FIG. 7, respectively.

Referring to FIGS. 7, 8A, and 8B, the display protector 100b includes the transparent base layer 110, the first stress relief adhesive layer 120a on a first surface of the transparent base layer 110, the second stress relief adhesive layer 120b on a second surface of the transparent base layer 110, and the UTG layer 130 on the first stress relief adhesive layer 120a.

In particular, the UTG layer 130 includes a first glass edge 130E1 and a second glass edge 130E2 each extending in a first direction (i.e., X direction) and respectively positioned on opposite sides to each other. In addition, the UTG layer 130 includes a third glass edge 130E3 and a fourth glass edge 130E4 each extending in a second direction (i.e., Y direction) perpendicular to the first direction and respectively positioned on opposite sides to each other.

In addition, the transparent base layer 110, the first stress relief adhesive layer 120a, and the second stress relief adhesive layer 120b have a common outer edge, and the common outer edge has a first film edge 110E1 and a second film edge 110E2 respectively corresponding to the first glass edge 130E1 and the second glass edge 130E2 and each extending in the first direction (i.e., X direction). Also, the outer edge has a third film edge 110E3 and a fourth film edge 110E4 respectively corresponding to the third glass edge 130E3 and the fourth glass edge 130E4.

As shown in FIGS. 7 and 8A, the first film edge 110E1 and the second film edge 110E2 may be offset by a first dimension d1 inwardly from the first glass edge 130E1 and the second glass edge 130E2, respectively. An offset of a film edge inwardly from a glass edge may be referred to as "minus offset". In addition, the term "inwardly" refers to a direction from the outer edge or each edge toward a center of the UTG layer 130.

Also, as shown in FIGS. 7 and 8B, the third film edge 110E3 and/or the fourth film edge 110E4 may be offset by a second dimension d2 outwardly from the third glass edge 130E3 and/or the fourth glass edge 130E4, respectively. That is, in some embodiments, the third film edge 110E3 may be offset outwardly from the third glass edge 130E3 by the second dimension d2. In some embodiments, the fourth film edge 110E4 may be offset outwardly from the fourth glass edge 130E4 by the second dimension d2. In some embodiments, the third film edge 110E3 and the fourth film edge 110E4 may be offset outwardly from the third glass edge 130E3 and the fourth glass edge 130E4 by the second dimension d2, respectively. An offset of a film edge outwardly from a glass edge may be referred to as "plus offset". Here, the term "outwardly" means a direction opposite to that of the term "inwardly".

The first dimension d1 may be about 20 μm to about 200 μm. In some embodiments, the first dimension d1 may be about 20 μm to about 200 μm, about 25 μm to about 180 μm, about 30 μm to about 160 μm, about 35 μm to about 150 μm, about 40 μm to about 140 μm, about 45 μm to about 130 μm, about 50 μm to about 120 μm, about 55 μm to about 110 μm, about 60 μm to about 100 μm, or any range between these values.

The second dimension d2 may be about 50 µm to about 400 µm. In some embodiments, the second dimension d2 may be about 50 µm to about 400 µm, about 60 µm to about 380 µm, about 70 µm to about 360 µm, about 80 µm to about 340 µm, about 90 µm to about 320 µm, about 100 µm to about 300 µm, about 120 µm to about 280 µm, about 140 µm to about 260 µm, or any range between these values. When the second dimension d2 is too small, folding reliability may be insufficient. When the second dimension d2 is too large, foreign substances may be excessively attached.

Here, the second dimension d2 may be an offset dimension from the folding axis FAX to be described below. The display protector 100b may be configured to be foldable around the folding axis FAX parallel to the first glass edge 130E1 and the second glass edge 130E2, this is already described with reference to FIGS. 1A to 2A, and thus a detailed description thereof is omitted here.

As such, by forming a plus offset in a folded portion with respect to the folding axis FAX, the reliability of the folded portion may be greatly improved when folding and unfolding are repeated. In other words, when a folded portion is minus-offset with respect to the folding axis FAX, the folded portion may be easily lifted as folding and unfolding are repeated. However, the inventors of the present disclosure have found that when a folded portion is plus-offset with respect to the folding axis FAX, lifting of the folded portion may be significantly reduced even when folding and unfolding are repeated.

Figure 9:
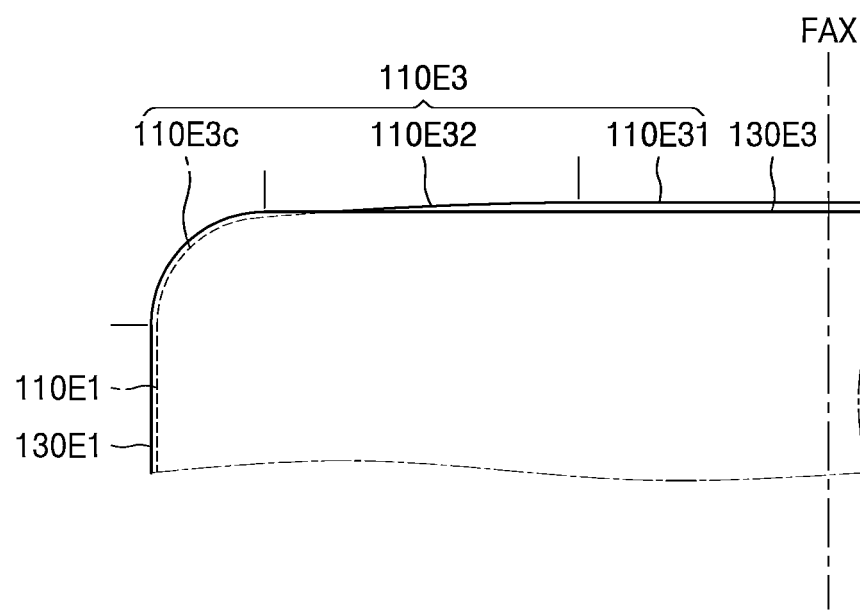
FIG. 9 is a partially enlarged view of a portion in which a first glass edge and a third glass edge of FIG. 7 meet and a vicinity of a folding axis.

FIG. 9 is a partially enlarged view of a portion in which the first film edge 110E1 and the third film edge 110E3 meet and a vicinity of the folding axis FAX.

Referring to FIGS. 7 to 9, the third film edge 110E3 includes a first film sub-edge portion 110E31 which is offset outwardly from the third glass edge 130E3 while crossing the folding axis FAX. The first film sub-edge portion 110E31 may include a portion extending in the second direction (i.e., Y direction) perpendicular to the first direction.

Also, the third film edge 110E3 may further include a first corner edge portion 110E3c meeting the first film edge 110E1. The first corner edge portion 110E3c may be minus-offset inwardly from an edge of a corner portion corresponding to the UTG layer 130.

The third film edge 110E3 may further include a second film sub-edge portion 110E32 between the first corner edge portion 110E3c and the first film sub-edge portion 110E31. In some embodiments, the second film sub-edge portion 110E32 may connect the first corner edge portion 110E3c to the first film sub-edge portion 110E31. As shown in FIG. 9, the second film sub-edge portion 110E32 may be offset outwardly from the third glass edge 130E3 over most of a length of the second film sub-edge portion 110E32. In some embodiments, the second film sub-edge portion 110E32 may be offset outwardly from the third glass edge 130E3 with respect to 80% or more of the length of the second film sub-edge portion 110E32. In some embodiments, a dimension by which the second film sub-edge portion 110E32 is offset outwardly may gradually decrease as a distance from the first corner edge portion 110E3c decreases. Furthermore, the second film sub-edge portion 110E32 may intersect the third glass edge 130E3 while getting closer to the first corner edge portion 110E3c. In addition, a vicinity of an area in which the second film sub-edge portion 110E32 and the first corner edge portion 110E3c meet may be offset inwardly from the third glass edge 130E3.

Although a portion in which the first film edge 110E1 and the third film edge 110E3 meet is described in FIG. 9, one of ordinary in the art will understand that the above description may be applied the same to a portion in which the second film edge 110E2 and the third film edge 110E3 meet, a portion in which the first film edge 110E1 and the fourth film edge 110E4 meet, and a portion in which the second film edge 110E2 and the fourth film edge 110E4 meet.

Figure 10:
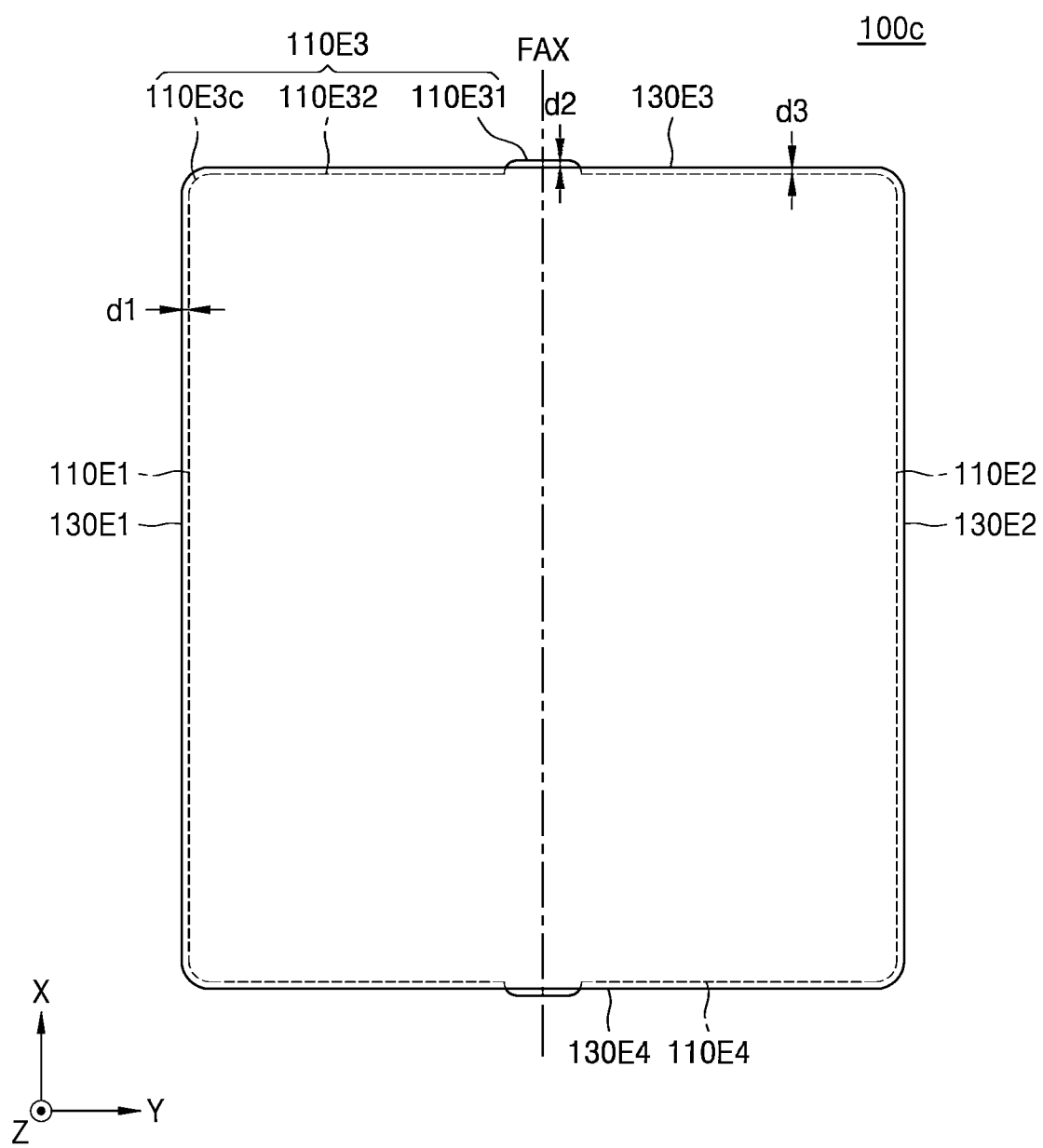
FIG. 10 is a schematic diagram illustrating a display protector according to another embodiment of the present disclosure.

FIG. 10 is a schematic diagram illustrating a display protector 100c according to another embodiment of the present disclosure.

Referring to FIG. 10, the third film edge 110E3 may include the first film sub-edge portion 110E31, the second film sub-edge portion 110E32, and the first corner edge portion 110E3c.

As shown in FIG. 10, the second film sub-edge portion 110E32 of the present embodiment may be offset by a third dimension d3 inwardly from a corresponding portion of the third glass edge 130E3 with respect to 80% or more of a total length of the second film sub-edge portion 110E32. In particular, the second film sub-edge portion 110E32 may include a portion extending in the second direction (i.e., Y direction) parallel to the third glass edge 130E3.

The third dimension d3 may be about 20 µm to about 200 µm. In some embodiments, the third dimension d3 may be about 20 µm to about 200 µm, about 25 µm to about 180 µm, about 30 µm to about 160 µm, about 35 µm to about 150 µm, about 40 µm to about 140 µm, about 45 µm to about 130 µm, about 50 µm to about 120 µm, about 55 µm to about 110 µm, about 60 µm to about 100 µm, or any range between these values.

In addition, the first film sub-edge portion 110E31 may include a portion extending in the second direction (i.e., Y direction) while crossing the folding axis FAX. The first film sub-edge portion 110E31 may have a plus offset portion, and the plus offset portion may have a width of about 3 mm to about 15 mm in the second direction. In some embodiments, the width may be about 4 mm to about 13 mm, about 5 mm to about 11 mm, about 6 mm to about 10 mm, about 7 mm to about 9 mm, or any range between these values.

Also, the first film sub-edge portion 110E31 may be offset by at least 20 µm outwardly from the third glass edge 130E3. In some embodiments, the first film sub-edge portion 110E31 may be offset by about 20 µm to about 400 µm outwardly from the third glass edge 130E3 at the folding axis FAX. In some embodiments, the first film sub-edge portion 110E31 may be offset by about 20 µm to about 400 µm, about 30 µm to about 380 µm, about 40 µm to about 360 µm, about 50 µm to about 340 µm, about 60 µm to about 320 µm, about 70 µm to about 300 µm, about 80 µm to about 280 µm, about 90 µm to about 260 µm, about 100 µm to about 240 µm, about 110 µm to about 220 µm, about 120 µm to about 200 µm, or any range between these values outwardly from the third glass edge 130E3 in the folding axis FAX. Because the display protector 100c shown in FIG. 10 also has a plus offset formed in a folded portion with respect to the folding axis FAX, reliability of the folded portion may be greatly improved when folding and unfolding are repeated.

Figure 11:
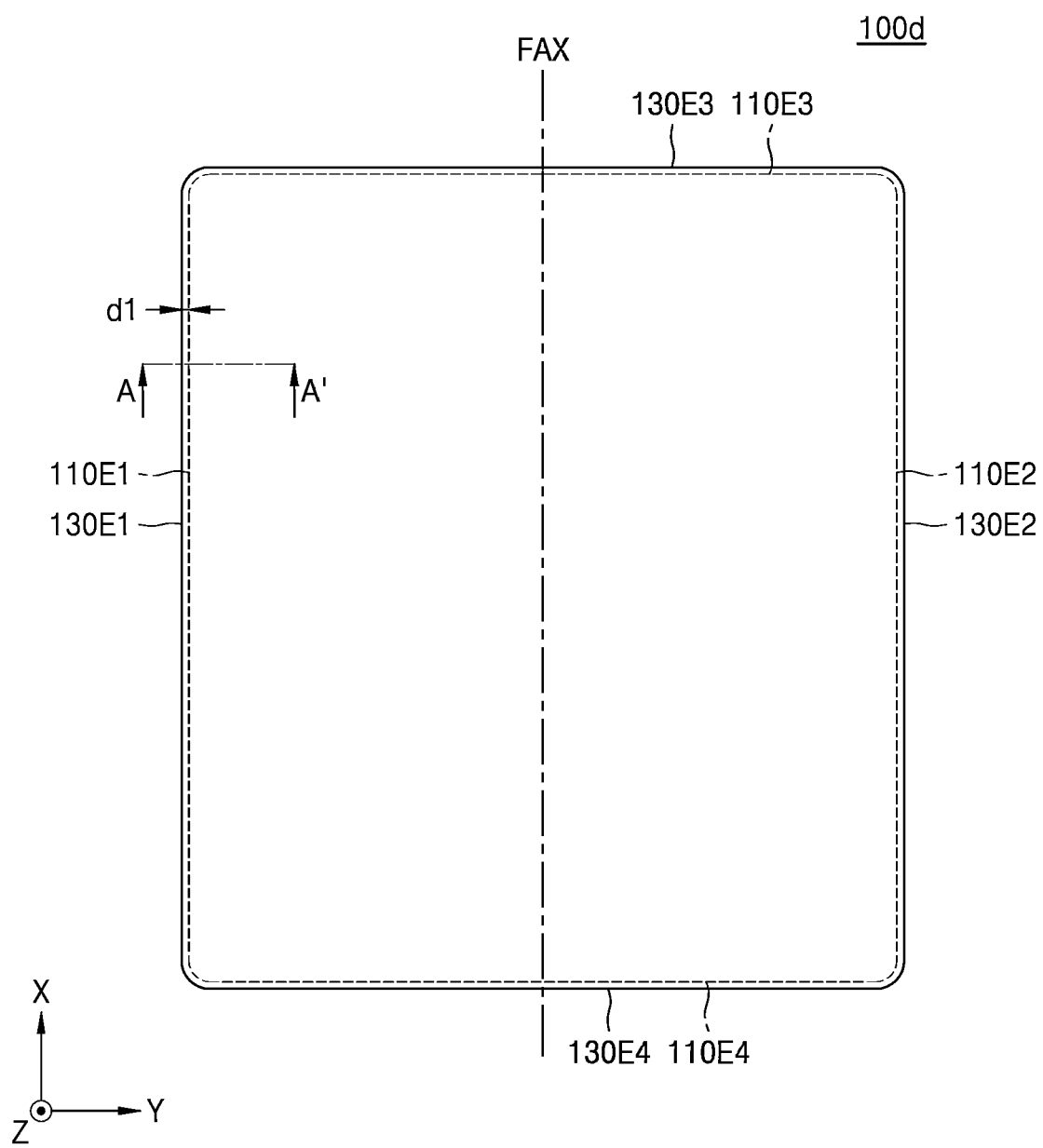
FIG. 11 is a schematic diagram illustrating a display protector according to another embodiment of the present disclosure.
Figure 12:
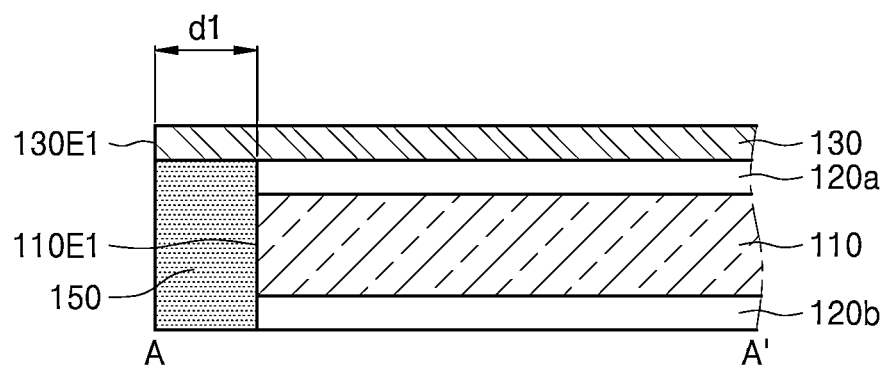
FIG. 12 is a cross-sectional view taken along line A-A' of FIG. 11.

FIG. 11 is a schematic diagram illustrating a display protector 100d according to another embodiment of the present disclosure. FIG. 12 is a cross-sectional view taken along line A-A' of FIG. 11.

Referring to FIGS. 11 and 12, the first to fourth film edges 110E1, 110E2, 110E3, and 110E4 may respectively be offset by the first dimension d1 inwardly from the first to fourth glass edges 130E1, 130E2, 130E3, and 130E4. That is, the first to fourth film edges 110E, 110E2, 110E3, and 110E4 may each be minus-offset.

As described above, because a minus offset is formed in a folded portion with respect to the folding axis FAX, reliability of the folded portion is greatly reduced unless other measures are taken. However, as shown in FIG. 12, an adhesive agent 150 is provided at a minus-offset portion. The adhesive agent 150 may extend along the minus-offset portion. That is, it was found that because the adhesive agent 150 extends across the folding axis FAX from a side surface of the third film edge 110E3, lifting in a folded portion may be significantly reduced even when folding and unfolding are repeated.

The adhesive agent 150 may be cured in an adhesive solution, and the adhesive solution may be an adhesive solution having a relatively low viscosity so that the adhesive solution may penetrate well by a capillary phenomenon in a space having a narrow width of the first dimension d1.

The adhesive solution may include, for example, a composition to which an additive such as a silane coupling agent is added by considering an adhesion between a base polymer, such as an acrylic resin, a styrene resin, or a silicone resin, a crosslinking agent, such as an isocyanate compound, an epoxy compound, or an aziridine compound, and glass. However, the present disclosure is not limited thereto.

In some embodiments, the viscosity of the adhesive solution may be about 10 cp to about 50 cp at a temperature of about 20° C. to about 25° C. When the viscosity of the adhesive solution is too low, an adhesive performance may decrease and a possibility of leakage may increase. On the other hand, when the viscosity of the adhesive solution is too high, permeability due to a capillary phenomenon may be reduced and thus the adhesive solution may not penetrate evenly.

An embodiment of the present disclosure provides a display protector attachment kit including a display protector and an adhesive solution.

The display protector attachment kit may include a display protector in which a transparent base layer has an arbitrary minus-offset with respect to a UTG layer, and an adhesive solution having an adhesive strength to a display surface while filling a space defined by the minus-offset. The adhesive solution may be UV-cured after filling the space defined by the minus-offset to act as an adhesive agent.

In some embodiments, the display protector may be any one of the display protectors described with reference to FIGS. 1A, 1B, 7, 10, and 11.

Example 24

After respectively attaching first and second stress relief adhesive layers each having an adhesive strength of 1200 g$_f$/in to both sides of a polyethylene terephthalate (PET) transparent base layer having a thickness of 12 µm, a UTG layer having a thickness of 30 µm is attached on the first stress relief adhesive layer. A laminate of the PET transparent base layer and the first and second stress relief adhesive layers was cut to have offsets of −100 µm, +50 µm, +150 µm, and +250 µm with respect to the UTG layer, and for each case, was attached to each of a device 1 and a device 2 to perform a folding test, and results thereof are summarized in Table 6. In addition, when there is an offset of −100 µm, a folding test was performed for each of a case in which an adhesive agent was formed and a case in which an adhesive agent was not formed

TABLE 6

| OFFSET (µm) | DEVICE 1 | DEVICE 2 |
| --- | --- | --- |
| −100 | 190 | 300 |
| +50 | 10,000+ | 2,030 |

TABLE 6-continued

| OFFSET (µm) | DEVICE 1 | DEVICE 2 |
| --- | --- | --- |
| +150 | 11,000+ | 17,481+ |
| +250 | 30,000+ | 10,000+ |
| −100 (+ADHESIVE AGENT) | 10,000+ | 6,000+ |

Referring to Table 6, when the laminate of the PET transparent base layer and the first and second stress relief adhesive layers is minus-offset with respect to the UTG layer in a folding axis, lifting occurred after 190 times and 300 times of folding and unfolding.

However, when a plus offset is included in the folding axis, no lifting occurred even after several thousands or several tens of thousands of folding and unfolding. In Table 6, the addition of "+" after a number means that no lifting occurred even in that number.

A display projector of the present disclosure is not only compatible with a foldable device or a rollable device, but also has excellent folding reliability so as not to peel off even when used for a long time in the foldable device or the rollable device, and is relatively easily detachable when desired.

In addition, it has been confirmed that even with a minus-offset, folding stability comparable to that of a plus offset may be secured by forming an adhesive agent in a space defined by the minus-offset. Although the embodiments of the present invention have been described in detail as described above, one of ordinary in the art to which the present disclosure pertains will be able to practice the present disclosure with various modifications without departing from the spirit and scope of the present disclosure as defined in claims. Accordingly, further modifications on the embodiments of the present disclosure will not depart from the technology of the present disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:
1. A display protector comprising:
   a transparent base layer having a first surface and a second surface opposite to the first surface;
   a first stress relief adhesive layer directly on the first surface of the transparent base layer;
   a second stress relief adhesive layer directly on the second surface of the transparent base layer; and
   an ultra-thin glass (UTG) layer on the first stress relief adhesive layer,
   wherein a storage modulus of the first stress relief adhesive layer is about 0.03 MPa to about 0.2 MPa at −10° C.
2. The display protector of claim 1, wherein
   each of the first stress relief adhesive layer and the second stress relief adhesive layer has an adhesive strength of about 600 gf/in to about 1,500 gf/in.

3. The display protector of claim 1, wherein
the storage modulus of the first stress relief adhesive layer is about 0.02 MPa to about 0.2 MPa at +40° C.

4. The display protector of claim 1, wherein
a storage modulus of the second stress relief adhesive layer is about 0.03MPa to about 0.2 MPa at −10° C.

5. The display protector of claim 1, wherein
a storage modulus of the second stress relief adhesive layer is about 0.02 MPa to about 0.2 MPa at +40° C.

6. The display protector of claim 1, further comprising a scattering prevention coating layer on the UTG layer.

7. The display protector of claim 1, wherein
the UTG layer has a thickness of about 30 micrometers (μm) to about 70 μm, and is tempered not to be damaged when folded at a radius of curvature of 1.0 mm.

8. The display protector of claim 1, wherein
the storage modulus of the first stress relief adhesive layer is less than or substantially equal to a storage modulus of the second stress relief adhesive layer.

9. The display protector of claim 1,
wherein each of the first stress relief adhesive layer and the second stress relief adhesive layer has an adhesive strength of about 600 gf/in to about 1,500 gf/in with respect to the transparent base layer and with respect to a foldable or rollable display to which the first stress relief adhesive layer and the second stress relief adhesive layer are attached.

10. The display protector of claim 9, wherein
a storage modulus of each of the first stress relief adhesive layer and the second stress relief adhesive layer is about 0.03 MPa to about 0.18 MPa at −10° C.

11. The display protector of claim 9, wherein
a storage modulus of each of the first stress relief adhesive layer and the second stress relief adhesive layer is about 0.02 MPa to about 0.18 MPa at +40° C.

12. The display protector of claim 9, further comprising a scattering prevention coating layer on the UTG layer and a thickness of the UTG layer is about 30 μm to about 70 μm.

13. The display protector of claim 1, wherein the UTG layer comprises:
a first glass edge and a second glass edge each extending in a first direction and positioned opposite to each other; and
a third glass edge and a fourth glass edge each extending in a second direction perpendicular to the first direction and positioned opposite to each other;
wherein the transparent base layer, the first stress relief adhesive layer, and the second stress relief adhesive layer include a common outer edge, wherein the common outer edge comprises:
a first film edge and a second film edge respectively extending parallel to the first glass edge and the second glass edge; and
a third film edge and a fourth film edge respectively corresponding to the third glass edge and the fourth glass edge,
wherein the first film edge and the second film edge are respectively offset inwardly from the first glass edge and the second glass edge.

14. The display protector of claim 13, wherein
the display protector is configured to be foldable with respect to a folding axis parallel to the first glass edge and the second glass edge.

15. The display protector of claim 14, wherein
the third film edge is at least partially offset outwardly from the third glass edge,
the fourth film edge is at least partially offset outwardly from the fourth glass edge, or
the third film edge and the fourth film edge are at least partially offset outwardly from the third glass edge and the fourth glass edge, respectively.

16. The display protector of claim 15, wherein
the third film edge and the fourth film edge are at least partially offset outwardly from the third glass edge and the fourth glass edge, respectively.

17. The display protector of claim 15, wherein
the third film edge comprises:
a first film sub-edge portion intersecting the folding axis and offset outwardly from the third glass edge;
a first corner edge portion forming an end portion of the third film edge and meeting the first film edge; and
a second film sub-edge portion connecting the first film sub-edge portion to the first corner edge portion,
the first corner edge portion is offset inwardly from a corresponding corner edge of the UTG layer.

18. The display protector of claim 17, wherein
the second film sub-edge portion comprises a portion offset outwardly from the third glass edge, and a dimension by which the second film sub-edge portion is offset outwardly gradually decreases as a distance from the first corner edge portion decreases.

19. The display protector of claim 17, wherein
the first film sub-edge portion is offset by at least 20 micrometers (μm) outwardly from the third glass edge, and
the second film sub-edge portion is offset inwardly from a corresponding portion than the third glass edge with respect to 80% or more of a length of the second film sub-edge portion.

20. The display protector of claim 17, wherein
a dimension by which the first film sub-edge portion is offset outwardly from the third glass edge on the folding axis is about 50 μm to about 400 μm.

* * * * *